(12) United States Patent
Gurevich et al.

(10) Patent No.: US 6,540,145 B2
(45) Date of Patent: Apr. 1, 2003

(54) APERTURE CONTROLLED LASER BEAM SHAPING TECHNIQUES FOR SCANNING OPTICAL CODE

(75) Inventors: Vladimir Gurevich, Stony Brook, NY (US); Mark Krichever, Hauppauge, NY (US); Yajun Li, Oakdale, NY (US)

(73) Assignee: Symbol Technologies, Inc., Holtsville, NY (US)

(*) Notice: Subject to any disclaimer, the term of this patent is extended or adjusted under 35 U.S.C. 154(b) by 0 days.

(21) Appl. No.: 09/921,034

(22) Filed: Aug. 2, 2001

(65) Prior Publication Data

US 2002/0011520 A1 Jan. 31, 2002

Related U.S. Application Data

(63) Continuation-in-part of application No. 09/714,511, filed on Nov. 17, 2000, which is a continuation-in-part of application No. 09/867,399, filed on May 31, 2001, and a continuation-in-part of application No. 09/330,053, filed on Jun. 11, 1999, now abandoned.

(51) Int. Cl.$^7$ .................................................. G06K 7/10
(52) U.S. Cl. .............................. 235/462.21; 235/462.22
(58) Field of Search .................... 235/462.01, 462.21, 235/462.22, 462.32, 462.45; 359/202, 641

(56) References Cited

U.S. PATENT DOCUMENTS

| | | | |
|---|---|---|---|
| 4,887,885 A | 12/1989 | Durnin et al. | |
| 5,056,881 A | 10/1991 | Bowen et al. | |
| 5,080,456 A | 1/1992 | Katz et al. | |
| 5,111,312 A | 5/1992 | Stewart | |
| 5,164,584 A | 11/1992 | Wike, Jr. et al. | |
| 5,231,624 A | 7/1993 | Finegan | |
| 5,245,619 A | 9/1993 | Kronberg | |
| 5,278,679 A | 1/1994 | Davis et al. | |
| 5,315,095 A | 5/1994 | Marom et al. | |
| 5,331,143 A | 7/1994 | Marom et al. | |
| 5,336,875 A | 8/1994 | Ono et al. | |
| 5,349,592 A | 9/1994 | Ando | |
| 5,386,105 A | * 1/1995 | Quinn et al. | ........... 235/462.22 |
| 5,475,208 A | 12/1995 | Marom | |
| 5,477,554 A | 12/1995 | Yoshii et al. | |
| 5,496,995 A | 3/1996 | Kato et al. | |
| 5,524,018 A | 6/1996 | Adachi | |
| 5,559,724 A | 9/1996 | Morrison | |
| 5,633,735 A | 5/1997 | Hunter, Jr. et al. | |
| 5,648,649 A | 7/1997 | Bridgelall et al. | |
| 5,673,136 A | 9/1997 | Inoue et al. | |
| 5,675,401 A | 10/1997 | Wangler et al. | |
| 5,734,152 A | 3/1998 | Goren et al. | |
| 5,932,860 A | 8/1999 | Plesko | |
| 6,016,223 A | 1/2000 | Suzuki et al. | |
| 6,092,728 A | 7/2000 | Li et al. | |
| 6,188,500 B1 | 2/2001 | Rudeen et al. | |

FOREIGN PATENT DOCUMENTS

| | | |
|---|---|---|
| GB | 2 256 298 | 12/1992 |
| JP | 10 227992 | 8/1998 |
| SU | 1620974 | 1/1991 |
| SU | 1753446 | 8/1992 |

OTHER PUBLICATIONS

J. Indebetouw; Nondiffracting Optical Fields: Some Remarks on Their Analysis and Synthesis; J. Opt. Soc. Am. A vol. 6, No. 1; 150–152 Jan. 1989.

(List continued on next page.)

Primary Examiner—Thien M. Le
Assistant Examiner—Larry D Taylor

(57) ABSTRACT

An improved optical system for scanning optical codes is disclosed. A laser beam produced thereby is a diverging, nearly diffraction free beam and may be used to produce an elongated scanning spot. An aperture may be employed such that variation in size of the aperture in one orthogonal dimension varies the size of the scanning spot in another orthogonal dimension.

22 Claims, 17 Drawing Sheets

OTHER PUBLICATIONS

R.M. Herman et al.; Production and Uses of Diffractionless Beams; J. Opt. Soc. Am. A vol. 8, No. 6; 932–942 Jun. 1991.

G. Scott et al.; Efficient Generation of Nearly Diffraction-Free Beams Using an Axicon; Opt. Eng. 31(12); 2640–2643 Dec. 1992.

L. C. Laycock et al.; Bessel beams: Their Generation and Application; GEC Journal of Research; vol. 10, No. 1; 36–51 (1992).

F. Gori et al.; Bessel–Gauss Beams; Optics Communications; vol. 64, No. 6; 491–494; Dec. 15, 1987; Elsevier Science Publishers B.V. North–Holland Physics Publishing Division.

R. Piestun et al.; Generalized Propagation–Invariant Wave Fields; J. Opt. Soc. Am. A; vol. 15, No. 12; 3039–3044 Dec. 1998.

P.L. Overfelt et al.; Comparison of Propagation Characteristics of Bessel, Bessel–Gaussian, and Gaussian Beams Diffracted by a Circular Aperture; J. Opt. Soc. Am. A vol. 8, No. 5; 732–744; May 1991.

C.F. Du Toit; The Numerical Computation of Bessel Functions of the First and Second Kind for Integer Orders and Complex Arguments; IEEE Transactions on Antennas and Propagation; vol. 38, No. 9; 1341–1349; Sep. 1990.

C. Palma et al.; Imaging of Generalized Bessel–Gauss Beams; Journal of Modern Optics; vol. 43, No. 11; 2269–2277; 1996; Taylor & Francis Ltd.

Y. Li et al.; Encircled Energy of Laser–Diode Beams; Applied Optics; vol. 30, No. 30; 4283–4284; Oct. 20, 1991.

J. Durnin et al.; Diffraction–Free Beams; The American Physical Society; vol. 58, No. 15; 1499–1501; Apr. 13, 1987.

R. W. Gerchberg et al.; A Practical Algorithm for the Determination of Phase from Image and Diffraction Plane Pictures; OPTIK, vol. 35, No. 2; 237–250; 1972.

A. Vasara et al.; Realization of General Non–Diffracting Beams with Computer–Generated Holograms; J. Opt. Soc. Am. A; vol. 6, No. 11; 1748–1754; Nov. 1989.

E. Marom et al.; Scanning with Axicon–Generated Beams; 1992 Optical Society of America Annual Meeting; Sep. 20–25, 1992 Albuquerque, New Mexico, 1992 Technical Digest Series, vol. 23; 115.

Staronski et al; Design of Uniform–Intensity Refractive Axicons; Optical Engineering; vol. 31, No. 3; 516–521; Mar. 1992.

Y. Li et al.; Propagation of Anisotropic Bessel–Gaussian Beams: Sidelobe Control, Mode Selection, and Field Depth; paper; Applied Optics; vol. 40, No. 16, 2709–2721; Optical Society of America; Jun. 1, 2001.

Y. Li et al.; Nonparaxial Analysis of the Far–field Radiation Patterns of Double–Heterostructure Lasers; Applied Optics; vol. 35, No. 9; 1442–1451; Mar. 20, 1996.

J. Durnin; Exact Solutions for Nondiffracting Beams I. The Scalar Theory; 1987 Optical Society of America, vol. 4, No. 4, 651–654, Apr. 1987.

* cited by examiner

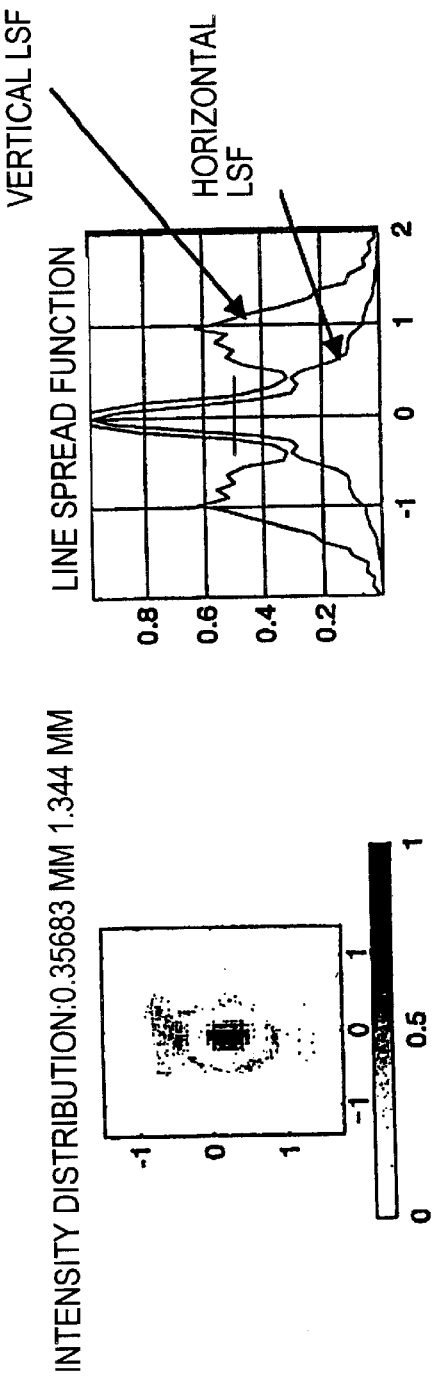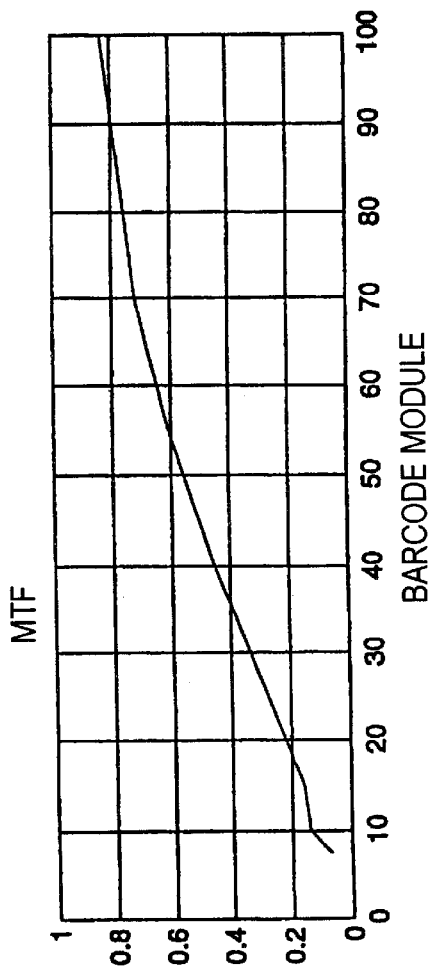
FIG. 11(a)
FIG. 11(b)
FIG. 11(c)

FIG. 12(a)
FIG. 12(b)
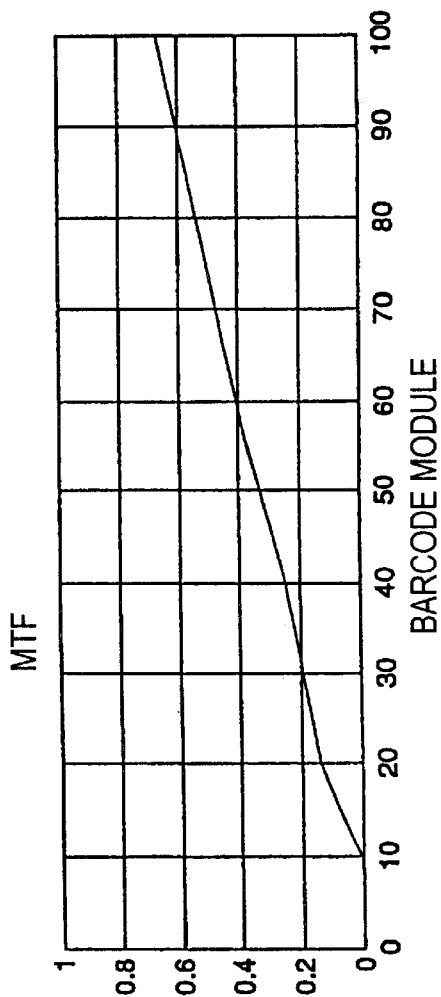
FIG. 12(c)

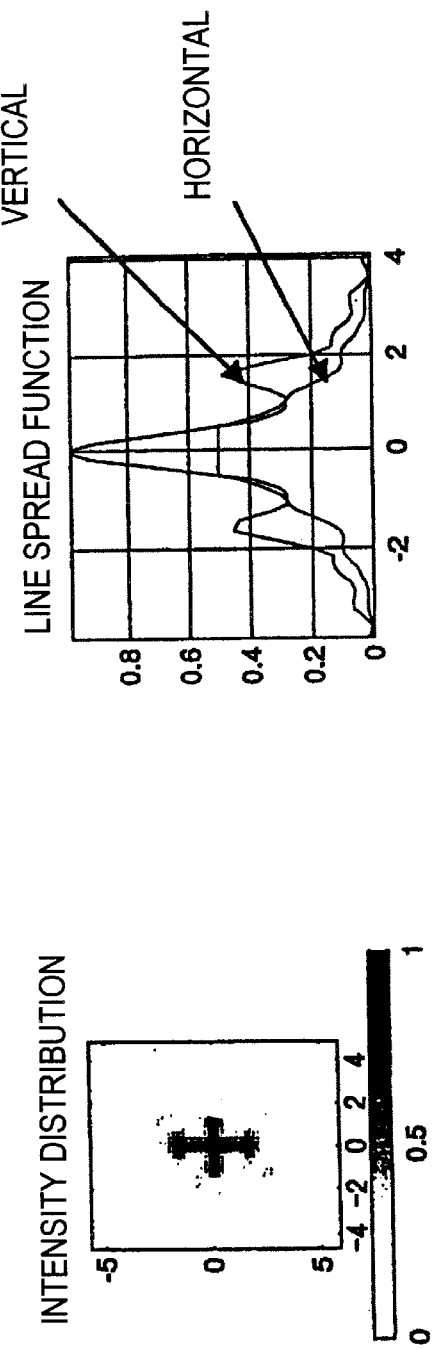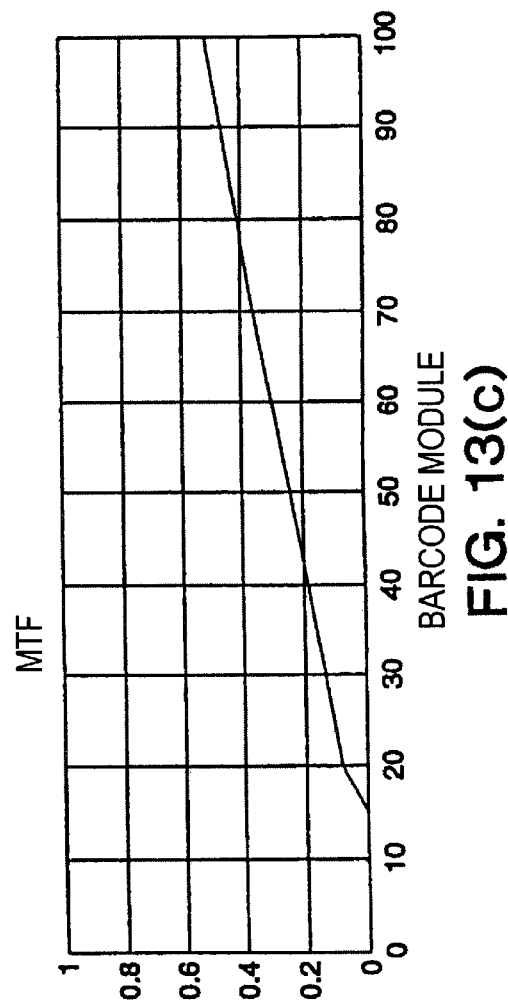
FIG. 13(a)
FIG. 13(b)
FIG. 13(c)

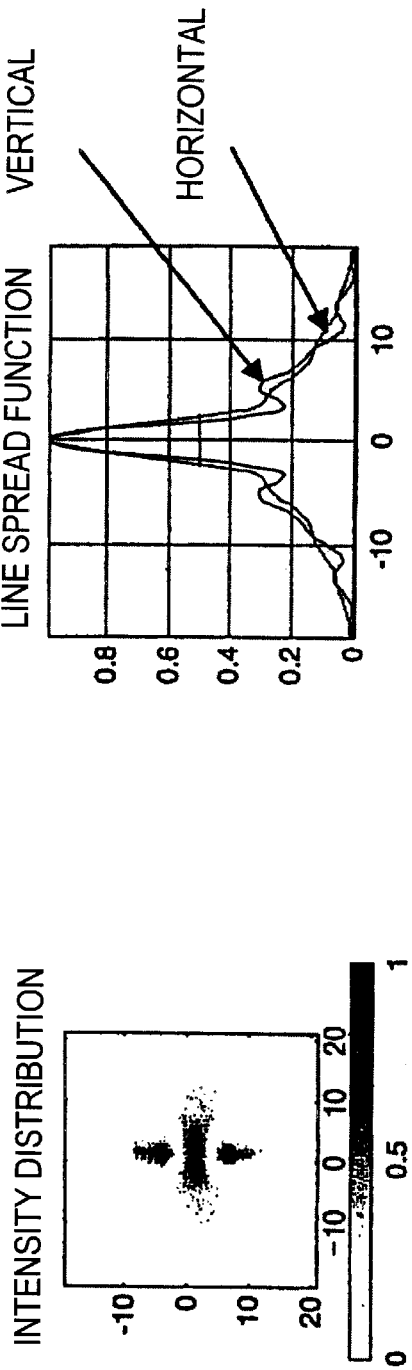
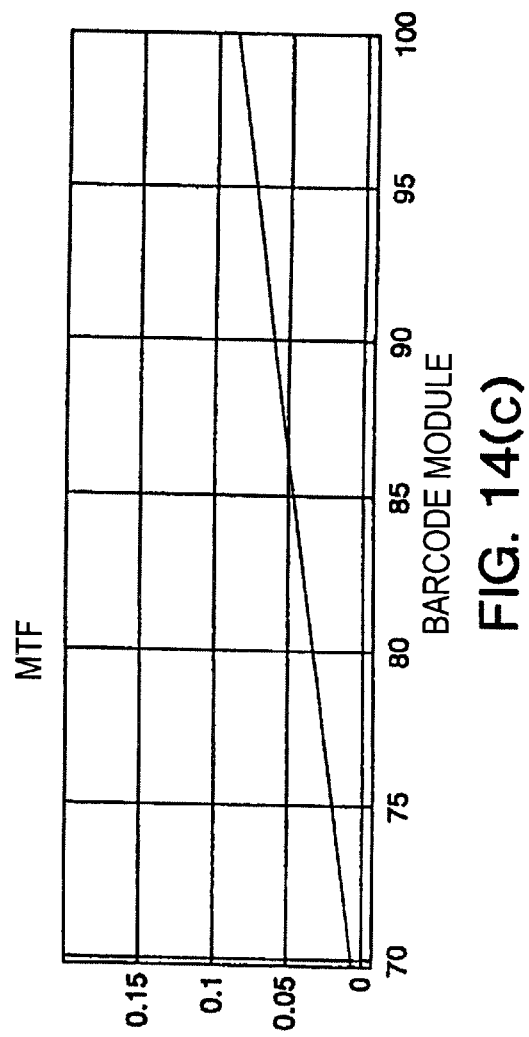
FIG. 14(b)
FIG. 14(a)
FIG. 14(c)

APERTURE CONTROLLED LASER BEAM SHAPING TECHNIQUES FOR SCANNING OPTICAL CODE

RELATED APPLICATIONS

This application is a continuation-in-part of U.S. application Ser. No. 09/714,511 filed Nov. 17, 2000 to Gurevich et al. entitled "Improved Beam Shaping System and Diverging Laser Beam For Scanning Optical Code", now pending which is hereby incorporated by reference herein.

This application is also a continuation-in-part of U.S. application Ser. No. 09/867,399 filed May 31, 2001 to Bergstein et al. entitled "Beam Shaping Optical Scanners", now pending which is hereby incorporated by reference herein. The Bergstein application is a continuation-in-part of U.S. application Ser. No. 09/330,053 filed Jun. 11, 1999 to Bergstein et al. entitled "Beam Shaping For Optical Scanners.", now abandoned.

FIELD OF THE INVENTION

This invention relates to optical scanning devices such as bar code scanners, and more particularly to beam-shaping systems for generating a scanning laser beam adapted for use with a selected broad range of working distances and symbol densities.

BACKGROUND AND OBJECTS

Bar code readers are known in the prior art for reading various symbologies such as UPC bar code symbols appearing on a label or on the surfaces of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into information, typically descriptive of the article or some characteristic thereof. Such information is conventionally represented in digital form and used as an input to a data processing system for applications in point-of-sale processing, inventory control and the like. Scanning systems of this general type have been disclosed, for example, in U.S. Pat. No. 5,600,121, assigned to the same assignee as the instant application. Such systems may employ a portable laser scanning device held by a user, which is configured to allow the user to aim the device, and more particularly, a scanning laser light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified typically by an optical assembly, to form a beam spot of a certain size at the target distance. It is preferred that the cross section of the beam spot at the target distance be approximately the same as the minimum width between regions of different light reflectivity, i.e., the bars and spaces of the symbol.

In the laser beam scanning systems known in the art, the laser light beam is directed by a lens or other optical components along the light path toward a target that includes a bar code symbol on the surface. The moving-beam scanner operates by repetitively scanning the light beam in a line, pattern or series of lines across the symbol by means of motion of a scanning component, such as a moving mirror placed in the path of the light beam. The scanning component may either sweep the beam spot across the symbol and trace a scan line across the pattern of the symbol, or scan the field of view of the scanner, or both.

Bar code reading systems also include a sensor or photo detector which detects light reflected or scattered from the symbol. The photo detector or sensor is positioned in the scanner in an optical path so that it has a field of view which ensures the capture of a portion of the light which is reflected or scattered off the symbol. The light is detected and converted into an electrical signal.

Some bar code reading systems are "retro-reflective". In a retro-reflective system, a moving optical element such as a mirror is used to transmit the outgoing beam and receive reflected light. Non-retro-reflective systems typically employ a moving mirror to transmit the outgoing beam and a separate detection system with a wide, static field of view.

Electronic circuitry and software decode the electrical signal in a digital representation of the data represented by the symbol that has been scanned. For example, the analog electrical signal generated by the photo detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the information or alphanumeric characters so represented. Such signal processors are disclosed in U.S. Pat. No. 5,734,152 assigned to Symbol Technologies, Inc. which patent is hereby incorporated by reference.

Different bar codes have different information densities and contain a different number of elements in a given area representing different amounts of encoded data. The denser the code, the smaller the elements and spacings. Printing of the denser symbols on an appropriate medium is exacting and thus is more expensive than printing symbols with larger elements. The density of a bar code symbol can be expressed in terms of the minimum bar/space width, also called "module size", or as a "spatial frequency" of the code, which is in the inverse of twice the bar/space width.

A bar code reader typically will have a specified resolution, often expressed by the module size that is detectable by its effective sensing spot. For optical scanners, for example, the beam spot size may be somewhat larger than the minimum width between regions of different light reflectivities, i.e., the bars and spaces of the symbol. The resolution of the reader is established by parameters of the beam source or the detector, by lenses or apertures associated with either the beam source or the detector, by the angle of beam inclination with respect to the plane of the symbol, by the threshold level of the digitizer, by the programming in the decoder, or by a combination of two or more of these elements. The photo detector will effectively average the light scattered from the area of the projected spot which reaches the detector aperture.

The region within which the bar code scanner is able to decode a bar code is called the effective working range of the scanner. Within this range, the spot size is such as to produce accurate readings of bar codes for a given bar code density. The working range is dependent on the focal characteristics of the scanner components and on the module size of the bar code.

Many known scanning systems collimate or focus the laser beam using a lens system to create a beam spot of a given diameter at a prescribed distance. The intensity of the laser beam at this point, in a plane normal to the beam (ideally approximately parallel to the scanned symbol), is ordinarily characterized by a "Gaussian" distribution with a high central peak. Gaussian beams typically have a profile along their axis of propagation exhibiting a waist (collimated) zone with limited divergence followed by a divergence zone thereafter. The collimated zone determines a depth of field (focusing range) for maximum bar code density. The working range is defined as the region within which the scanned beam spot is sufficiently well formed that its detected scattered radiation can be decoded by the scanner. But as the distance between the scanner and the symbol moves out of the working range of the scanner, which is typically only a few inches in length, the Gaussian distribution of the beam spot greatly widens, preventing accurate reading of a bar code. Such scanning systems, accordingly, must be positioned within a relatively narrow range of distances from a symbol in order to properly read the symbol. Where $\lambda$ is the laser wavelength, where $R_0$ is the starting radius of the laser beam at the system aperture. More preferably, $$\frac{\alpha}{5 \cdot R_0} < \beta < \frac{\alpha}{R_0}$$

The present invention also teaches the construction of an optical system having at least one optical element for partially collimating the laser beam, providing optical power to reduce beam divergence and for producing a wave front as described in Equation 24 below. In preferred embodiments, the optical system includes a plano convex lens for partially collimating the laser beam and an optical element having a substantially flat first surface perpendicular to the optical axis of the system and a second surface defined by a figure of rotation formed by rotating a line about the optical axis at an acute angle to define an optical element which causes a phase tilt in the beam inward toward the optical axis. The beam so produced has a transverse field distribution that can be expressed as a series containing the Bessel functions. Essentially only the axial peak of beam is employed for scanning.

The present invention also includes a method of producing a laser beam for scanning an optical code. A diverging laser beam is provided by a semiconductor laser. The divergence of the laser beam is reduced by, for example, a lens to a predetermined non-zero divergence. A generally conical wave front deformation is imposed on the laser beam, for example by a lens with a conical surface. These steps can be performed in any order or simultaneously. Such a diverging axicon laser beam is produced for scanning optical code. The beam may be used in a method of scanning a symbol. According to this method, a beam of laser light is generated. The transverse intensity pattern of the beam shows a It has been proposed to create a laser scan beam by directing a collimated beam of laser light onto a linear axicon optical element, for example, a conical lens, to produce a beam of light which exhibits a consistent spot size over a substantial distance along the axis of the beam. Such an optical system is disclosed in U.S. Pat. No. 5,331,143 to Marom et al. and assigned to Symbol Technologies, Inc., which patent is hereby incorporated by reference.

The aforementioned axicon system produces a nearly diffraction free beam. The use of such a beam has been proposed to maximize the focusing limited working range of the scanning beam. Such a beam exhibits substantially no divergence over a relatively long distance range and then breaks into a donut like spot pattern of intensity distribution. Such a non-diverging beam can provide two to three times the range of a conventional Gaussian beam for a particular bar-code density. However, as noted by applicants, where such a beam is designed to improve performance in scanning a certain bar code density, the corresponding working ranges of lower density symbols are not increased significantly or at all, being limited by the distance where the beam breaks into a donut-like distribution ("donut distance").

Accordingly, it is a primary object of the present invention to optimize and maximize the working ranges of a bar code scanner for a wide variety of bar code densities.

Some conventional scanners employ two laser optical systems: one a short working range system and the second a long working range system. Such scanners have multiple operating modes, which allow for the selection of a different optical system, spot sizes and scanning beam depending on the distance of the target system. However, such systems are larger and more complicated than single source scanners, and consequently tend to be more expensive and less desirable for all these reasons.

It is another object of the present invention to provide a compact and inexpensive bar code scanner with improved working ranges and variety in the bar code densities which can be read at such ranges.

It is known that in certain scanning applications, an elongated or elliptical spot may be used to improve the performance of the scanning system. See, for example, U.S. Pat. No. 5,648,649 to Bridgelall. When an elliptical spot is employed, ideally the major axis of the spot is oriented parallel to the major axes of the bars making up the target code and perpendicular to the direction of beam scan. Such a spot form may reduce inaccuracies in reading the code, because, e.g. an elliptical spot system is somewhat less susceptible to errors introduced by voids and spreads in the symbol and speckle noise.

Conventionally, the elliptical spot is generated from a Gaussian distribution laser beam by introducing a cylindrical optical power in a direction perpendicular to the scanning direction and/or employing an elliptical or rectangular exit pupil. Applicants have observed that such techniques are ineffective in producing an effective spot geometry when an axicon laser beam is employed.

Accordingly, it is another object of the present invention to provide improved techniques for producing an elongated spot geometry in a laser scanning system employing both Gaussian and non-Gaussian laser beams.

In a bar code scanner which relies on a precise scanning laser beam profile and spot geometry, changes in temperature that affect the optical properties of the beam producing system can degrade the performance of the system such as by reducing effective working range, reducing readable code density at a particular distance and generally reducing the accuracy of the system. Various techniques have been proposed for reducing temperature variation ("athermalizing") optical systems in bar code readers. Such systems are disclosed, for example, in U.S. Pat. No. 5,673,136 to Inoue and U.S. patent application Ser. No. 09/109,018 filed Jul. 1, 1998 to Li et al. and assigned to Symbol Technologies, Inc., which application is hereby incorporated by reference.

Typically glass optical elements are less affected by temperature changes than are plastic optical elements having the same nominal optical properties. Typically, also, plastic optical elements are less expensive and less difficult to fabricate and replicate.

It is a further object of the present invention to provide improved athermalized optical systems for laser scanners, both for conventional laser scanners and scanners adapted to achieve the other objects of the present invention.

These and other objects and features of the present invention will be apparent from this written description and the associated drawings.

SUMMARY

The present invention relates to an improved axicon optical system for scanning optical codes. The improved beam-shaping systems of the present invention are capable of generating nearly diffraction-free beams to improve the ability to scan bar codes. A laser beam produced thereby has a central peak having a controlled divergence and may be used to produce an elongated scanning spot. Aspects of the present invention also relate to a laser assembly which may be used to produce scanning beams including the above-mentioned diverging beam with elongated spot. The apparatus combines various optical functions in structures which are relatively insensitive to temperature change.

The present invention includes an optical code scanner employing a diverging, nearly diffraction free laser beam to scan optical code symbols. The source of the laser beam may include a laser diode and an optical system positioned with respect to the laser diode and configured to produce a diverging laser beam with a generally conical wave front which flattens radially outwardly from an axis of propagation of the beam. In preferred embodiments, the nearly diffraction-free beam has an elongated transverse intensity distribution which forms an elongated spot on a reference surface perpendicular to an axis of propagation of the beam at a minimum working distance from the scanner. The central peak in the transverse intensity does not split into rings or donuts within the designed working range. For example, the beam produces a spot at the minimum working distance of the scanner which has a dimension $d_0$ in the direction of scanning which is less than 13 mils and a dimension d, greater than 160 mils at the maximum working distance of the scanner. For example, embodiments of the scanner are capable of using the laser beam to read 7.5 mil code at a minimum working distance of less than 9 inches and to read 100 mil code at a maximum working distance greater than 520 inches.

The present invention also includes a laser beam for use in scanning bar codes. The inventive beam has a wave front which deviates from a reference plane perpendicular to its axis of propagation, the deviation being characterized by a phase whose dependence is given by $$W(r)=\alpha r - \beta r^2$$

where $W(r)$ is the deviation; where r is radial distance from the axis of propagation; where $\alpha$ is selected to produce a spot at the minimum scanning distance with a diameter $d_0$ sufficient to permit the reading of the highest density bar code to be scanned; and where $\beta$ is selected to provide optimum working ranges for bar codes of different densities. In preferred embodiments, $\alpha$ is selected between $0.2 \times 10^{-3}$ and $6 \times 10^{-3}$. $\beta$ is selected so that $$\frac{\lambda}{10 \cdot R_0^2} < \beta < \frac{2 \cdot \alpha}{R_0}$$

central peak surrounded by a plurality of side lobes symmetrically located on either side of the central peak. The beam has a high degree of energy confinement near the propagation axis when the beam travels to the symbol. The modified beam may be moved across the symbol to scan the symbol.

Another aspect of the present invention relates to a laser scanner apparatus for producing a laser beam with an elongated spot for scanning a symbol. The apparatus includes the use of a partially reflective mirror, which is placed in the optical path of a circular or non-circular diffraction-free beam. Light is partially transmitted and partially reflected. However, the reflected portion of the beam returns to the same direction as the transmitted beam by a second reflection on the back of the mirror. A nearly diffraction-free beam is obtained with an elongated transverse intensity distribution by a superposition of the two portions of the incident beam. Advantageously, the two portions are sufficiently displaced so that optical interference of these two portions is negligible. Centers of the beam portions may be displaced from one another along an axis perpendicular to a direction of scanning of the laser scanner apparatus. The result is an elongated region of illumination on a reference plane perpendicular to the beam portions in at least part of a working range of the laser scanner apparatus. Advantageously, the beam portions are sufficiently displaced so that they have minimum overlap. Preferably, the optical system used to produce the elongation is a single period diffraction grating with a cosine-shaped profile.

In an alternative embodiment, the optical system includes an optical plate having two planar refractive surfaces which are non-parallel and from each of which a portion of the laser beam is propagated. In yet another alternative embodiment, the optical system includes a partially reflective plate having two planar reflective surfaces from each of which a portion of the laser beam is propagated.

The present invention also includes apparatus and techniques for providing a system aperture to optimize the laser beam used by the code reader based on system requirements and intended use. In accordance with a preferred embodiment, a laser beam with an elliptical spot is produced by a laser diode. A laser beam is projected from an optical code reader along a projection axis z, for scanning an optical code in a direction x, generally perpendicular to an axis of elongation of features in the optical code. The axis of elongation of the elliptical spot is oriented perpendicular to the scanning direction x. The dimensions of a central peak of the beam in planes perpendicular to the projection axis increase in both the x and y directions with distance from the code reader. The laser beam from the laser diode is truncated by an aperture in the optical code reader. A change in a y dimension of the aperture changes an x dimension of the central peak of the beam, thus providing an additional design parameter or variable.

As discussed above, the laser beam may have a wave front which deviates from a reference plane perpendicular to the axis of propagation z, the deviation being characterized by the formula:

$$W(r)=\alpha r - \beta r^2$$

where $W(r)$ is the deviation; where $\alpha$ is selected to produce a spot at the minimum scanning distance with a diameter $d_0$ sufficient to permit the reading of the highest density bar code to be scanned; and where $\beta$ is selected to provide optimum working ranges for bar codes of different densities. Advantageously $\alpha$ is between $0.2 \cdot 10^{-3}$ and $6 \cdot 10^{-3}$ mm$^{-1}$. Advantageously $\beta$ is less than $\alpha/0.5$ w where w is the width of the aperture in the x direction.

The foregoing apparatus can be employed in designing optical code readers. In the design process a source of a beam of laser light is selected, preferably a laser diode with an elliptical beam spot. An optical system is selected for modifying the beam of laser light to create a beam which has a generally conical wave front and an intensity profile in the direction x characterized by a central peak with a diameter which increases as a function of distance from the apparatus. An aperture is selected for limiting the beam and for producing a desired dimension in the x direction of the central peak. More specifically, an aperture dimension perpendicular to the x direction is selected to vary the dimension of the central peak in the x direction. The selections may be made on the basis of anticipated symbol module size, anticipated scanning range and desired depth of field.

The aperture may be characterizable by the two orthogonal dimensions, w and h, such that a change in the h dimension of the aperture changes a dimension of the spot in the x direction. In a preferred embodiment the aperture is defined by a rectangular-shaped opening with the dimension w and the dimension h being in the x and y directions, respectively. In other embodiments the aperture is defined by an elliptical-shaped opening or by a cats-eye-shaped opening, wherein the dimensions h and w represent the major and minor axes of these shapes, respectively.

The present disclosure also includes techniques for enhancing the temperature stability of the laser beam source. A lens system may be employed having a glass lens with at least one spherical surface; and a molded plastic element having a non-planar refractive surface located on an optical axis of the glass lens. The combination of the plastic lens and the glass lens provides an aspherical lens system with essentially all of the optical power in the glass lens and with greater temperature stability than an optically equivalent aspherical plastic lens. The plastic element may include at least one surface configured to produce the generally conical wave front deformations described, herein. The molded plastic element may also provide a single period grating or provide an aberration correction for the glass lens. Preferably, rotationally symmetric elements can be formed on one surface of the plastic element, and cylindrical elements can be formed on the other surface.

An athermalized laser assembly may be constructed from a laser diode, a lens system, and first and second members for maintaining the relative positions of the laser diode and lens system. The first member may be a tube having a first coefficient of thermal expansion and effective length L in the direction of an optical axis of the laser assembly. The second member may be a cylindrical sleeve. The sleeve may have a second, larger coefficient of thermal expansion and an effective length $L_p$ in the direction of the optical axis of the laser assembly. The sleeve and tube may be telescoping and together confine the separation between the laser diode and lens system to a desired spacing along the optical axis of the assembly. The lengths L and $L_p$ and the thermal properties of the tube and sleeve are selected so that linear expansion of the sleeve in one direction along the optical axis of the assembly substantially cancels out the linear expansion of the tube in the opposite direction.

The laser assembly may be constructed with a lens system which includes a lens with at least one spherical surface. A lens element integral with the sleeve provides a conical surface and a single period diffraction grating with a cosine-shaped profile. The laser diode and lens system may be positioned with respect to one another and configured to produce a diverging, nearly diffraction free beam having an elongated region of illumination in a reference plane perpendicular to the laser beam within a working range of the laser assembly.

The foregoing is intended to summarize certain aspects of the invention. The subject matter intended to be protected is, however, defined by the claims and equivalents thereof.

BRIEF DESCRIPTION OF THE DRAWINGS

FIGS. 10 through 14 illustrate laser spot characteristics of the beam of FIG. 9 at various working distances including intensity distribution (a), spread function (b) and MTF (c);

TABLE OF CONTENTS

I. Laser Beams. For Versatile Code Reading Systems
   FIGS. 1, and 4 to 6
II. Radially Elongated (Stretched) Laser Beams And Associated Optical Systems
   FIGS. 7 to 14
III. Plastic Aberration Corrector For Glass Lenses
   FIG. 15
IV. Athermalized Laser Assembly Using Plastic Element
   FIG. 17
V. Athermalized Optical System For Producing Laser Beams, Including Elongated, Diverging Nearly Diffraction Free Beams

FIG. 18

VII. Performance Variations With Changes In Aperture
FIGS. 19 to 22.

DETAILED DESCRIPTION

The present invention provides novel and useful laser beams with profiles and spot geometries which can be adapted to optimized working ranges and code densities according to the intended use of the laser scanner. The present invention also provides optical systems for producing such laser beams. The systems are readily fabricated and thermal stable.

Figure 1:
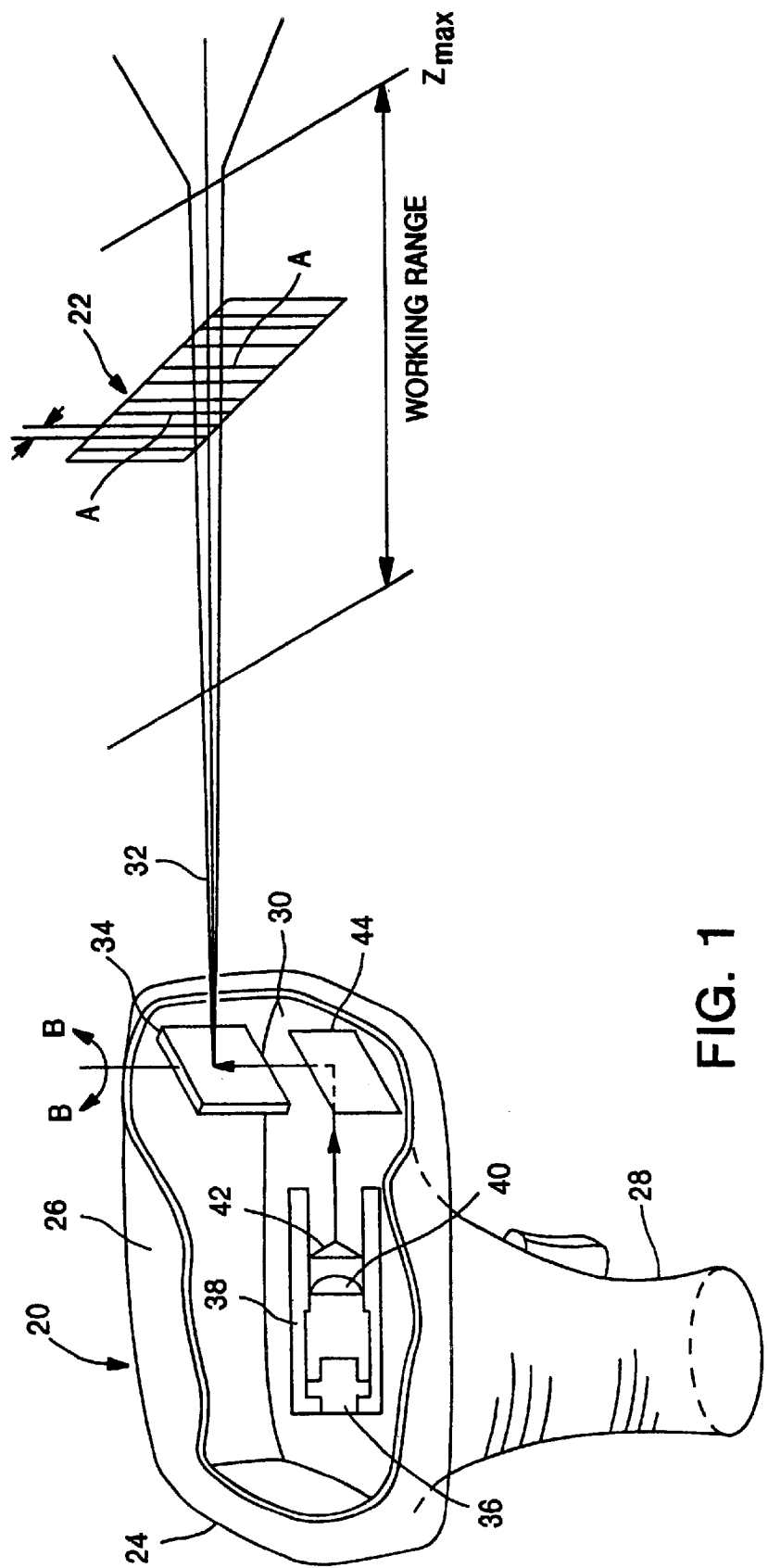
FIG. 1 is a pictorial cut away view of a hand held laser scanner illustrating certain aspects of the present invention.

FIG. 1 is a pictorial cut away view of a hand held laser scanner device 20 illustrating certain aspects of the present invention. The device is usable in reading symbols including the one dimensional bar code symbol 22. It will be understood that aspects of the present invention may also be used in reading two dimensional optical code symbols such as PDF code and MaxiCode.

The laser scanner device 20 given as the example here, is of a type having a housing 24 with a barrel portion 26 and a pistol grip handle portion 28. The present invention may also be implemented in other types of scanners including stationary point of sale units, pen scanners, ring scanners, etc.

In the illustrated embodiment, the barrel portion 26 of the housing is formed with an exit port or window 30 through which an outgoing laser light beam 32 passes. The beam 32 is shown impinging on the bar code symbol 22, at a distance from the scanning device.

The laser beam 32 scans across the bar code symbol 22 along a path A—A which, at least under ideal conditions is perpendicular to the principle axes of the bars and spaces making up the symbol 22. This linear scanning movement of the laser beam 32 is generated by an oscillating optical element such as the pivoting mirror 34 shown in the embodiment of FIG. 1. If desired, driving mechanisms may be provided to scan the beam 32 through a two dimensional scanning pattern to permit reading of two dimensional bar code symbols.

The scanner device 20 includes a source of laser light such as the laser diode 36 shown in the embodiment of FIG. 1. The laser diode may be mounted in a tube 38, which in turn is positioned in the housing. A photo detector (not shown) is provided within the housing to receive at least a portion of the light reflected by the bar code 22. The photo detector may face outwardly through the window 30, or, alternatively may face the scan mirror 34 to receive light reflected from the symbol 22. The photo detector detects light reflected from the symbol 22 and creates an analog electrical signal. A digitizer and decoder processes signals from the photo detector in the conventional way to derive information from the symbol 22.

The laser diode produces a laser beam which, in the embodiment of FIG. 1, is directed onto a lens 40 and a linear axicon lens 42. The appropriate selection of lens surfaces and component placements as well as various alternative embodiments are discussed in detail below. The beam 32 has a central peak which will produce a spot of a size which increases with distance from the scanner—a diverging beam. The central spot is largely unaffected by diffraction effects. These and other important properties of the beam are also discussed in detail below.

In the embodiment of FIG. 1, the laser beam exits the tube 38 and is reflected off of a folding mirror 44 toward the scan mirror 34. The scan mirror is pivoted in the direction indicated by the double-headed arrow B—B to produce a desired beam scanning pattern. The system can read codes close to the system of some maximum density and has a maximum working distance which may be dictated by the donut distance $Z_{max}$, discussed below.

Laser Beams For Versatile Code Reading Systems

Preferred embodiments of the present invention employ a laser beam having wave front deformation at a reference plane perpendicular to an optical axis of the system at, for example, an exit pupil of focusing system. The deformed wave front is described by the following formula:

$$W(r) = \alpha \cdot r - \beta \cdot r^2 \tag{1}$$

where $$\beta > 0 \tag{2}$$

and where r is the radial distance from the optical axis and $\alpha$ is the cone angle of the wave front cone as defined below.

Figure 2:
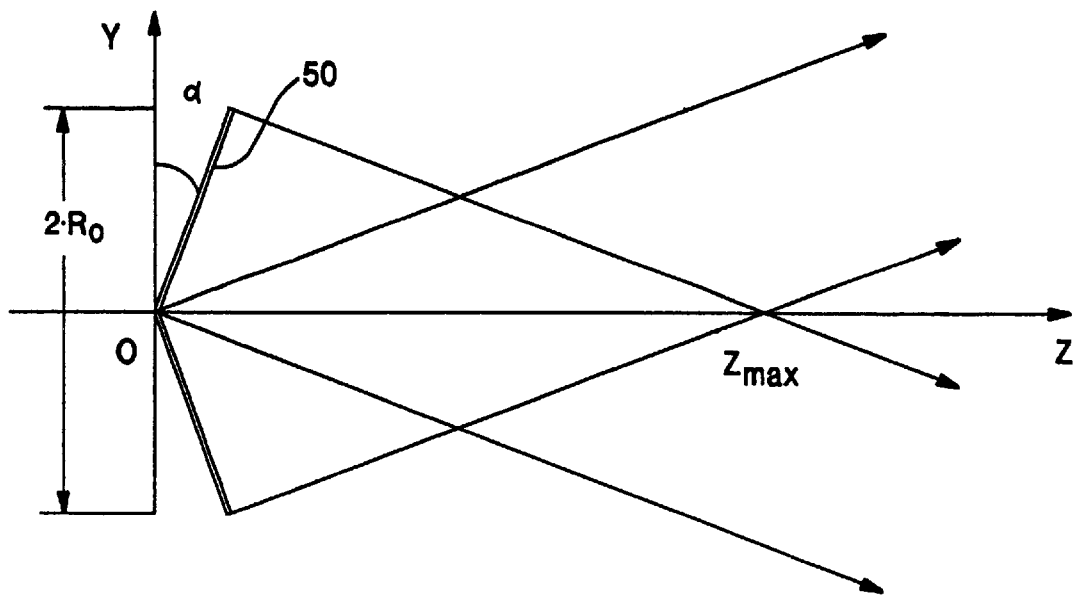
FIG. 2 is a diagram showing a wave front and ray structure of a prior art non-diverging axicon beam.
Figure 3:
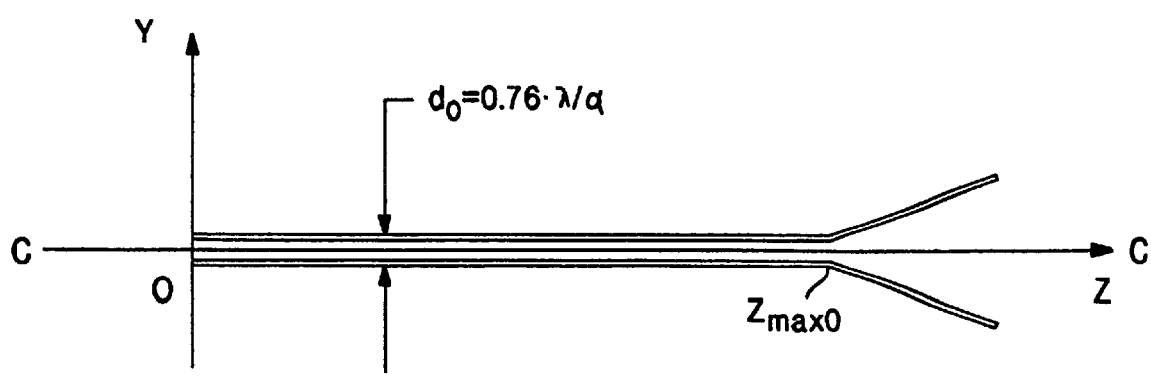
FIG. 3 is a diagram showing the approximate beam profile of a prior art non-diverging axicon beam.

To understand properties and advantages of the beam (1), consider first propagation of an infinite conical wave (non-diverging axicon beam) such as described in the above-mentioned '143 patent to Marom et al. The properties of such a beam are shown in FIGS. 2 and 3. The wave front of the beam can be described by deviation from the reference plane by an equation of the form:

$$W_0(r) = \alpha \cdot r \tag{3}$$

It is known that such a wave produces a non-diverging Bessel beam. The diameter of the beam central peak do is determined by the wave length $\lambda$ and wave front cone angle $\alpha$:

$$d_0 = 0.76 \cdot \lambda / \alpha \tag{4}$$

Although the theoretically infinite Bessel beam does not change with distance, its intensity is equal to zero, so that energy is conserved.

For bar code scanners, an essentially non-divergent axicon-like laser beam that are close to a Bessel beam bounded by a Gaussian envelope had been proposed in the '143 patent providing larger working ranges than conventional Gaussian beams. Consider such a laser beam as shown in FIGS. 2 and 3 having at a starting distance (Z=0), on the axis of propagation C—C, radius $R_0$ and a conical wave front (50). Similar to the theoretical Bessel beam, this beam propagates practically with zero divergence. However, the beam intensity is not zero any more. The price paid is that the beam breaks into a donut shaped intensity distribution after distance $Z_{max0}$. $Z_{max0}$ is given by the expression:

$$Z_{max0} = R_0 / \alpha \tag{5}$$

The scanner has working ranges on high and low density bar codes limited by the distance $Z_{max0}$. Obviously, in order to increase working range of the beam, one could increase $Z_{max0}$ by increasing the beam radius $R_0$. A limitation here comes from the fact that the larger $R_0$, the less relative energy goes into central maximum $d_0$, and the lower the Modulation Transfer Function (MTF) of the scanning laser beam. In practice, $R_0$ may, for example, be a physical aperture such as a circular or elliptical mask or be dictated by the size of the beam produced by the laser and lens system.

Figure 4:
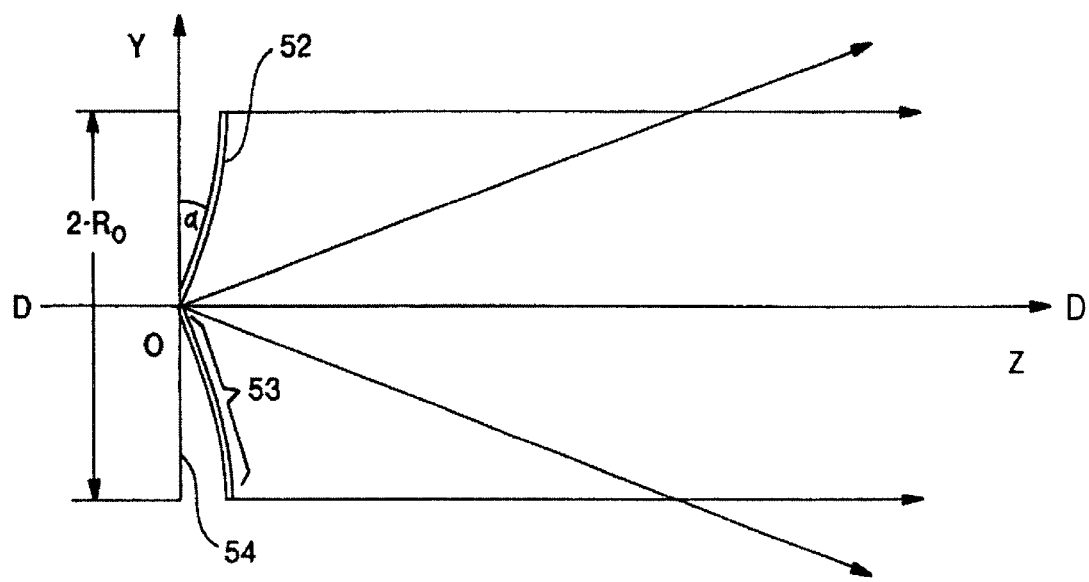
FIG. 4 is a diagram showing a wave front and ray structure of a laser beam of a preferred embodiment of the present invention.

In accordance with the present invention, a wave front deformation is performed consistent with equation 1. Such a wave front 52 is shown in FIG. 4. The wave front 52 is generally conical and flattened at its radial edge. One form of the wave front is a shape generated by rotating a curved line 53 at an acute angle a about the axis of propagation D—D of the system. The form of the line may be selected to produce a nearly conical wave front near the axis D—D and to produce a flattening toward reference plane 54 in radially outward portions of the wave front 52 closer to the edge of the aperture.

One way to produce this beam is to transform the beam of equation 3 using a lens with a focal length of $F=-1/(2\beta)$ in the reference plane $Z=0$. One can understand this transformation based on the lens function: the plane wave front is transformed into a spherical one with radius equal to F. In other words, the lens introduces a wave front deviation equal to sag of the sphere with radius F. For $r<<F$:

$$\Delta W(r)=(F^2+r^2)-F\approx 0.5\ r^2/F$$

If $$F=1/(2\beta) \tag{6}$$

Then $$\Delta W(r)=-\beta \cdot r^2,\text{ and } W(r)=W_0(r)+\Delta W(r) \tag{7}$$

The profile of beam $W(r)$ can be determined by following the rule of geometrical optics: The intensity distribution that takes place in the beam $W_0(r)$ at a distance $Z_0$ will take place also in the beam $W(r)$ but at different distance Z with magnification $M=Z/Z_0$. According to the lens formula:

$$1/Z-1/Z_0=1/F=-2\cdot\beta \tag{8}$$

$$d/d_0=M=Z/Z_0=1-Z/F=1+2\cdot\beta\cdot Z \tag{9}$$

Beam $W_0(r)$ does not diverge until donut distance $Z_{max0}$ (see FIG. 3). According to (5), (6), and (8), donut distance of the beam $W(r)$ will be determined by:

$$Z_{max}=Z_{max0}\cdot F/(F+Z_{max0})=R_0\cdot F/(R_0+F\cdot\alpha)=R_0/(\alpha-2\cdot\beta\cdot R_0) \tag{10}$$

Within $0<Z<Z_{max}$, the profile of the beam of equation (1) can be determined using equation (9):

$$d=d_0\cdot(1+2\cdot\beta\cdot Z) \tag{11}$$

Figure 5:
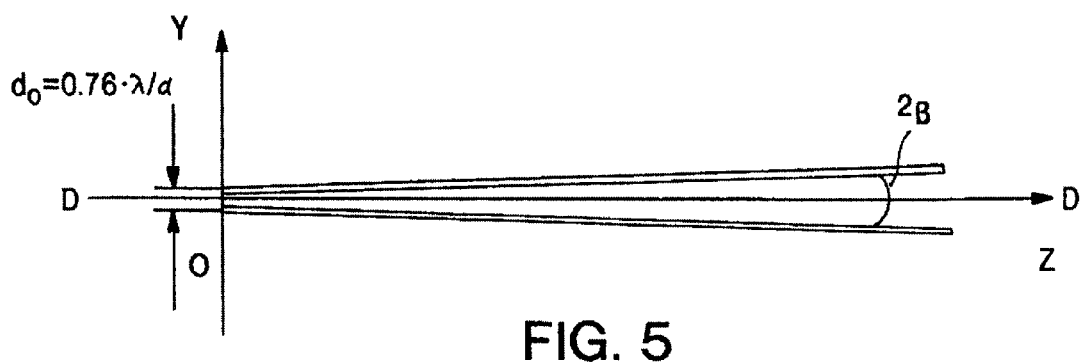
FIG. 5 is a diagram showing the approximate beam profile of a beam of a preferred embodiment of the present invention.

The profile of the central portion of this beam along the axis of propagation D—D is shown in FIG. 5. As indicated by equation d is essentially independent of aperture size. As shown in FIG. 5, the beam diverges approximately linearly.

The profile slope is, in effect, a beam magnification caused by the lensing. The divergence of the beam of FIG. 5 is two to three times less than the divergence of a truncated Gaussian beam with comparable source and beam radius. Unlike a Gaussian beam, the diameter d of the central peak is not appreciably affected by the system aperture $R_0$ or the diffraction caused thereby. Although the beam profile may contain side lobes, the sharpness and diameter d of the central peak may be controlled through the working range of the system. Diffraction does not appreciably affect the spot with distance from the scanner and the central peak is largely determined by geometric effects rather than diffractive effects.

Equations (10) and (11) show advantages of the proposed beam of Equation (1) over the known non-diverging axicon beam of Equation (3):

(a) The donut distance is increased or the donut effect is eliminated completely, as indicated by the following expressions:

$$Z_{max}=R_0/(\alpha-R_0\cdot 2\beta)>Z_{max0},\text{ if }0<\beta<\alpha/(2R_0) \tag{12}$$

$$Z_{max}\rightarrow\infty\text{ if }\beta=\alpha/(2R_0) \tag{13}$$

The increased donut distance $Z_{max}$ of the beam of equation (1) permits the increase of working ranges simultaneously for high and low-density bar codes. Note that the beam does not break into donut at all if $\beta>\alpha/(2R_0)$ because $Z_{max}$ becomes negative.

(b) The central peak diameter d of the laser beam of equation (1) changes approximately linearly with distance Z from the reference plane ($Z=0$) (see FIG. 5), in accordance with the relation $$d(Z)=d_0\cdot(1+2\cdot\beta\cdot Z) \tag{14}$$

where $d_0$ is determined by equation (4). The linear increase of the scanner ranges with the decrease in bar code density is a useful feature of the present invention given that it is natural to scan larger bar codes from greater distances.

The following procedure can be used to choose the coefficients a and $\beta$ to provide an optimum combination of working ranges for a variety of bar code densities:

(1) Choose a maximum starting beam radius $R_0$ (100% encircled energy) and central maximum diameter do based on the signal processing requirements for reading the highest density bar code to be read by the system.

(2) Calculate $\alpha$ from equation (4).

(3) Determine $\beta$ based on optimum trade-off between working ranges for high-density and low-density bar codes. A preferred upper limit for $$\beta\text{ is}<\frac{2\alpha}{R_0},$$

more preferably $$\beta<\frac{\alpha}{R_0}.$$

The following Table I illustrates difference between working ranges of a non-diverging axicon beam ($\beta=0$) and two diverging beams of the present invention. In all cases, $\alpha=1.4\cdot 10^{-3}$, $R_0=1.75$ mm, and optimum laser bar code signal processing is assumed using a first derivative signal processor.

TABLE I

| Bar-code module, mil | Working ranges in inches | | |
|---|---|---|---|
| | $\beta = 0$ | $\beta = 0.4\cdot 10^{-3}\text{ mm}^{-1}$ | $\beta = 0.6\cdot 10^{-3}\text{ mm}^{-1}$ |
| 4 | — | — | — |
| 5 | 11 | — | — |
| 7.5 | 30 | 30 | 15 |
| 10 | 44 | 58 | 35 |
| 15 | 49 | 94 | 80 |
| 20 | 56 | 120 | 110 |
| 40 | 48 | 200 | 240 |
| 55 | 56 | 265 | 340 |
| 70 | 60 | 320 | 435 |
| 100 | 60 | 420 | 627 |

After having $\alpha$ and $\beta$ determined, known optical design components may be used to generate wave front (1) based upon desired location of exit pupil, axicon vertex position relative to the exit pupil, and other optomechanical constraints. Some of the possible optical systems for producing the beam of FIGS. 4 and 5 are shown in FIG. 6.

FIGS. 6(a) through 6(h) are ray traces of marginal and axial rays in various optical systems for producing the diverging nearly diffraction free beams invention. In each Figure in which they appear, element 100 is a laser diode, element 102 is a plano-convex negative lens and element 104 is a linear axicon lens (i.e. lens with a plano surface and a conical surface of revolution made by rotating a straight line at an angle $\theta=\alpha/(n-1)$ about the optical axis E—E, where n is the index of refraction of the material out of which the linear axicon lens is made.

Figure 6A:
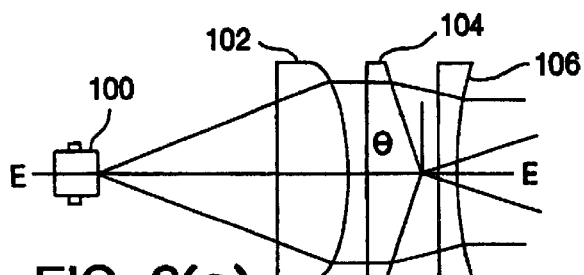
FIGS. 6(a) through (h) are examples of various combinations of optical elements which may be employed to produce a diverging, nearly diffraction free beam of a preferred embodiment of the present invention.

The optical system of FIG. 6(a) employs a spherical collimation lens 102, a linear axicon lens and a plano-concave positive spherical lens 106, all located on the optical axis EE. Advantageously, the laser diode 100 and collimation lens 102 may be part of a laser diode package. The laser beam from the collimation lens next impinges on the linear axicon lens where its wave front is deformed from a planar shape (coplanar with the piano surface of the linear axicon lens 104) to a conical shape as described above. The beam from the linear axicon lens is further deformed by the lens 106 and defocused to form the diverging axicon beam of a preferred embodiment of the present invention.

Figure 6B:
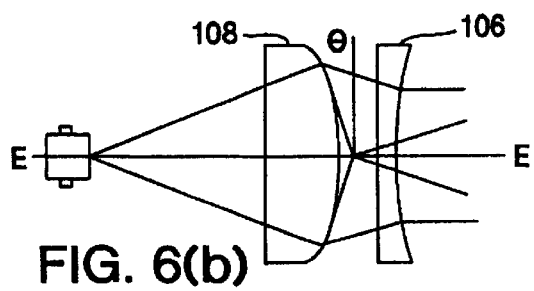

In the optical system of FIG. 6(b) the collimation lens and linear axicon of FIG. 6(a) have been merged into a single optical element 108 which performs the functions of elements 102 and 104 of FIG. 6(a). The surface of the element 108 is a composite of the surface heights of non-planar surfaces of elements 102 and 104 of FIG. 6(a).

Figure 6C:
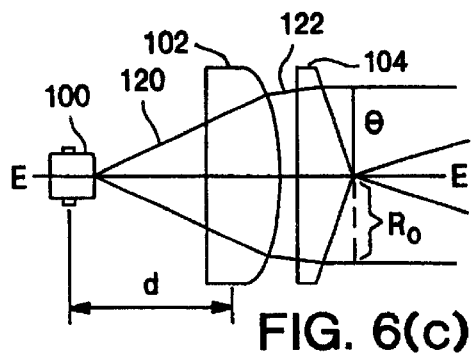

In the optical system of FIG. 6(c) the lens 102 and distance d from the effective point source origin of the beam from the laser diode 100 are selected to partially collimate and focus the laser beam to produce a wave front with a deformation of $-\beta r^2$ from a reference plane parallel to the plane back surface of lens 102. In other words, the divergence of the beam 120 from the assumed point source is reduced to a lesser, non-zero divergence at 122. $R_0$ denotes the system aperture.

Figure 6D:
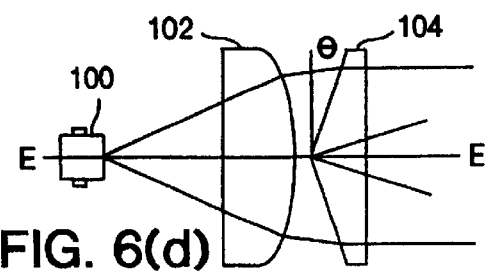

In the optical system of FIG. 6(d), the linear axicon lens has been reversed from the orientation shown in FIG. 6(c). However, the optical system functions in essentially the same way as that of FIG. 6(c), to produce a diverging beam of a preferred embodiment of the present invention.

Figure 6E:
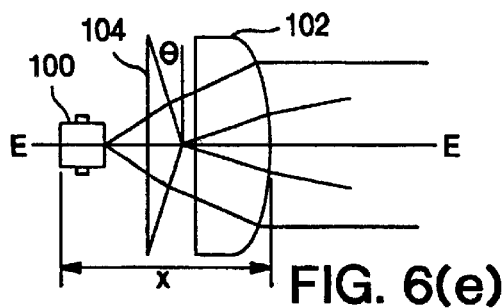
Figure 6F:
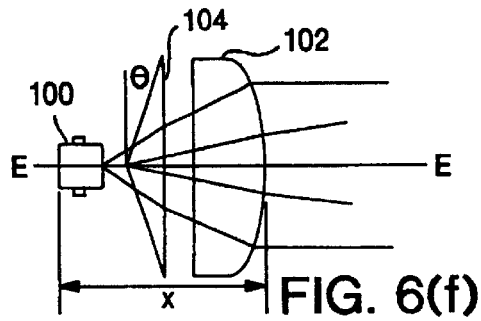

In the optical systems of FIGS. 6(e) and (f) the positions of the linear axicon lens 104 and the lens 102 have been reversed over those shown in the preceding Figures. Also, the physical cone angle of the conical surface of the lens 104 is somewhat larger than that of linear axicon surfaces of FIGS. 6(a)–(d), in order to produce a diverging beam similar to that produced by the optical systems of those preceding Figures. The resultant system of FIGS. 6(e) and 6(f) have a reduced depth, x, which may be advantageous in applications where compactness of the optical assembly is important to the overall design.

Figure 6G:
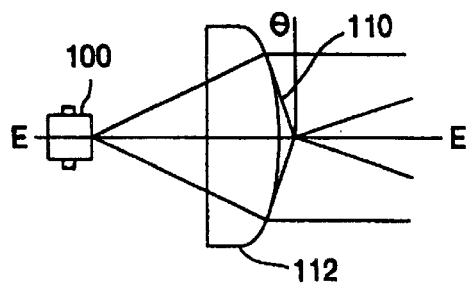
Figure 6H:
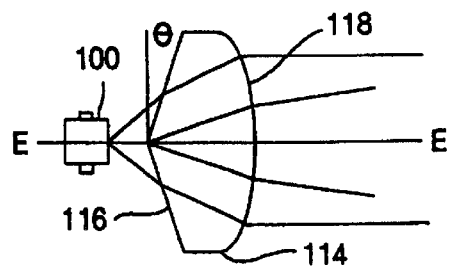

In the optical systems of FIG. 6(g), the lens surface and linear axicon surface have been merged to produce surface 110 of optical element 112. The system of FIG. 6(h) employs a lens 114 with linear axicon back surface 116 and a negative power spherical surface 118. In both systems, the component separation, negative power and physical cone axis of the axicon are selected to produce a diverging axicon beam in accordance with equation (1).

From the foregoing, it will be apparent that there are many equivalent optical structures for producing the laser beam of the present invention. It will be understood by persons skilled in the optical design arts that such implementations may include mirrors, diffractive elements, gratings, or volume holographic bodies.

II. Radially Elongated (Stretched) Laser Beams And Associated Optical Systems As noted above, the advantages of using an elliptical spot in laser bar code scanning is well-known. Frequently this spot shape is produced with a cylindrical lens. However, applicants have observed that this common mechanism for producing ellipticity in Gaussian beams is not suitable for use with axicon beams. Instead of the desired elliptical beam in the near field and circular beam in the far field, the result is a round spot in the near field and multiple spots at far distances. In accordance with the present invention, instead of using cylindrical power, the laser beam may be split in vertical direction. Beam splitting can be achieved by using a diffraction grating or various refractive or reflective surfaces. These embodiments will now be described.

Figure 7A:
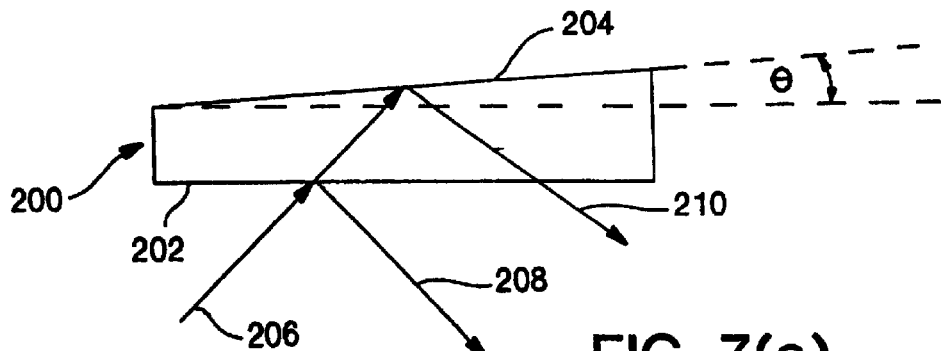
FIGS. 7(a) and 7(b) illustrate the use of optical elements to produce an elongated spot from a laser beam in accordance with the present invention.
Figure 7B:
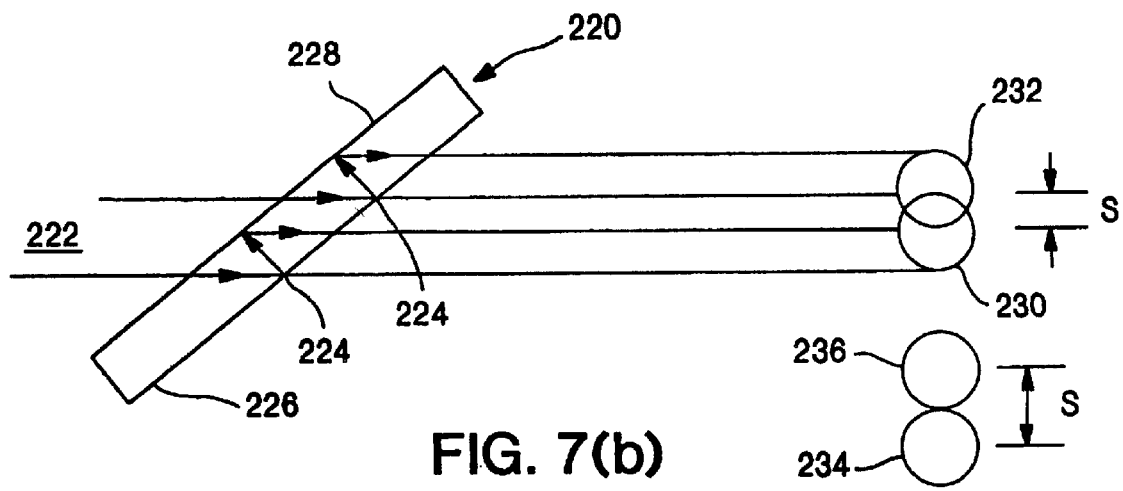

A first approach for obtaining an expanded beam width in a direction orthogonal to the scanning, is to generate replicas or portions of the beam, via a beam-splitter, tilted plate, etc., (see FIGS. 7(a) and 7(b)). This achieves an expanded beam front without significantly affecting other properties of the original beam. Care needs to be taken to ensure that the interference between the beams at their fringe regions when they do partially overlap, does not adversely affect the performance of the scanner.

One way of stretching a beam is to use a mirror to split the incident beam and overlap the beam portions as shown in FIGS. 7(a) and 7(b). As shown in FIG. 7(a), a mirror 200 which may be the scan mirror has a beam splitting surface 202 and reflective surface 204. An incoming beam 206 will be split into at least two beams: 208 and 210. Surfaces 202 and 204 are tilted at a small angle $\theta$ from parallel. Therefore, beams 208 and 210 will not be parallel. The small angle between beams 208 and 210 provides the elongated or stretched laser spot.

Another method of generating an elongated beam is illustrated by the embodiment of FIG. 7(b). A partially reflective mirror 220 is placed at an angle in the optical path of a beam 222, particularly the diverging nearly diffraction free beam previously discussed. Light is partially transmitted and partially reflected as indicated by the rays at 224 at the optical interface 226. For example, the surface at 226 may be 50% silvered. Light reflected at the interface 226 may be re-reflected at interface 228, which may be an essentially 100% reflective surface. The result may be two partially overlapping beam portions 230 and 232. The separation distance S between the centers of the beam portions, advantageously, remains constant through the working range of the scanner. Alternative beam portions 234 and 236 are also shown which are separated so that there is no overlap of their central maxima, hence no appreciable interference effects. In this embodiment, the dimension of the spot, perpendicular to the scanning direction is effectively doubled.

A preferred method of producing an elongated or stretched beam makes the use of what may be thought of a diffraction grating. The approach is based on a device consisting of a course (low spatial frequency) grating positioned over the beam aperture. This could be achieved with an amplitude grating (which is partially absorbing, thus reducing the power throughput) or a phase grating (which is non-absorbing, and can provide greater beam stretching in view of the many diffraction orders that it contains). In the following embodiments, systems are described using a simple uniform aperture. Nevertheless, the results are expected to be similar for arbitrarily shaped apertures.

In a preferred embodiment, beam elongation is achieved using a very small diffracting angle which corresponds to only one period of a grating defined by the equation:

$$G(y) = G_0 \cos\left(2\pi \frac{y}{A}\right) \quad (15)$$

where G is the grating phase, y is the lateral coordinate perpendicular to the scanning direction, A is the vertical aperture, and $G_0$ is the amplitude of the grating phase.

Equation (15) describes a cosine surface. Its optical power over the aperture is equal 0. As will be seen in the example presented below, this technique generates a smooth elongated spot in the near field. The technique is useful in application to axicon beams lacking inherent ellipticity. It is also useful in adding ellipticity to other conventional beams.

Figure 8:
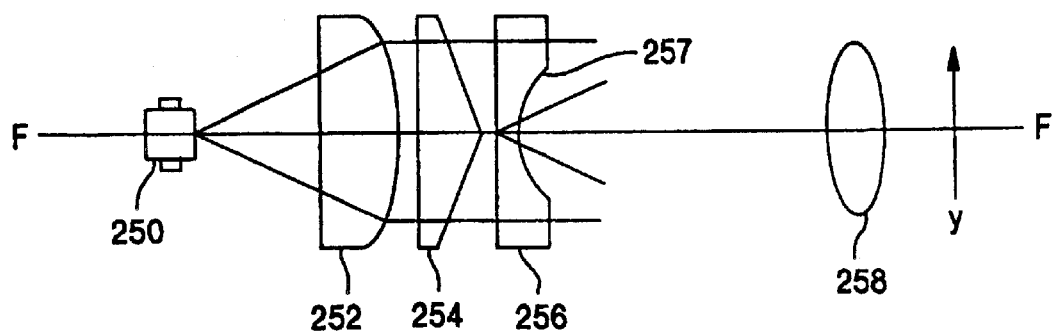
FIG. 8 illustrates the combination of optical elements including a cosine profile optical surface for stretching the spot produced in an optical system in accordance with a preferred embodiment of the present invention.

A system for producing an elongated, diverging beam is illustrated in FIG. 8. The system consists of a laser beam source 250, positive lens 252, linear axicon lens 254 and lens 256 having a surface 257 generated by a line perpendicular to the optical axis F—F which tracks the cosine curve of equation (15). It will be observed that the components and their arrangement in FIG. 8 are similar to FIG. 6(c) discussed above, but with the addition of the cosine surface lens 256. The resultant beam propagates in a direction along optical axis F—F. The spot 258 is stretched or elongated in the y direction.

The following is a theoretical evaluation of the use of a grating to achieve beam elongation. Let a flat aperture (1–D) be defined as "rect (x/a)" which is equal to 1 for $|x|<a/2$ and 0 elsewhere. Then in the "far field" one gets $$rect\left(\frac{x}{a}\right) \Leftrightarrow a\,\text{sinc}(af_x) \quad (16)$$

where "→" denotes the Fourier transform, $$\text{sinc}(af_x) = \frac{\sin(\pi af_x)}{\pi af_x} \quad (17)$$

and $f_x$ is the spacial frequency along the x-axis in the plane of the Fourier spectrum. Multiplying this function with an amplitude coarse grating (of period "a"):

$$t(x) = \frac{1}{2}\left[1 + \cos\left(2\pi \frac{x}{a}\right)\right] \quad (18)$$

The Fourier transform of the product of the functions given by Eqs. (16) and (18) leads to the following expression $$rect\left(\frac{x}{a}\right)t(x) \Leftrightarrow \frac{a}{2}\left\{\text{sinc}(af_x) + \frac{1}{2}[\text{sinc}(af_x+1) + \text{sinc}(af_x-1)]\right\} \quad (19)$$

for the far field of diffraction. Furthermore, if a phase-only grating is used, the transmittance can be expressed as $$t(x) = \exp\left[i\gamma\cos\left(2\pi\frac{x}{a}\right)\right] \quad (20)$$

Incidentally such a grating may be achieved either by diffractive means (DOE) or refractive ones. The relation between γ and the physical height h of the grating variations is $$\gamma = \frac{2\pi}{\lambda}(n-1)h \quad (21)$$

where λ is the light wavelength and n the index of refraction of the material, assumed to be surrounded by air (n=1).

Since the phase grating has also a periodicity "α", it can be expanded in a Fourier series, thus leading to $$\exp\left[i\gamma\cos\left(2\pi\frac{x}{a}\right)\right] = \sum_n J_n(\gamma)\exp\left(2n\pi i \frac{x}{a}\right) \quad (22)$$

where $J_n$ is the Bessel function of order n. Thus, when a phase mask multiplies the input, one gets in the far field:

$$rect\left(\frac{x}{a}\right)\exp\left[i\gamma\cos\left(2\pi\frac{x}{a}\right)\right] \Leftrightarrow a\,\text{sinc}(af_x) * \sum_n J_n(\gamma)\delta\left(f_x - \frac{n}{a}\right) = \quad (23)$$

$$a\sum_n J_n(\gamma)\text{sinc}(af_x - n)$$

The result thus consists of several replicas of the original pattern propagating along the different diffraction orders and weighted according to the depth of the grating corrugation. As noted above, it is proposed to use a defocused beam with wave front at the exit pupil:

$$W(r) = \alpha \cdot r - \beta \cdot r^2, \quad (1)$$

where r is the radial coordinate, α is the cone coefficient, and β is the defocus coefficient. To achieve beam stretching, the laser beam is elongated in the direction perpendicular to the scanning using a one-period diffraction grating which, in generalization, can be expressed in the form:

$$G(y) = \sum_{m=1}^{M} g_m \cos\left(2m\pi\frac{y}{A}\right) \quad (15a)$$

where G(y) is the phase delay suffered by the wave at coordinate y in passing through the element, A is the linear dimension of the aperture in the y-direction and M is an integer. In the preferred case of M=1, Eq. (15a) reduces to the form $$G(y) = g_1 \cos\left(2\pi\frac{y}{A}\right) \quad (15b)$$

where y is the vertical coordinate, A is the vertical aperture dimensions, and $w_1$ is the amplitude of wave front deformation.

Combining equations (1) and (15), the optimum diverging elongated beam can be obtained when using the following wave front deformation at the system exit pupil:

$$W(x, y) = a\sqrt{x^2 + \varepsilon y^2} - \beta(x^2 + y_2) + \sum_{m=1}^{M} w_m \cos\left(2m\pi\frac{y}{A}\right) + \gamma y^2 \quad (24)$$

The following values are typical:

$$\alpha=(0.2-6)\times 10^{-3}; \varepsilon=1; \gamma=0;$$

and $$\frac{\lambda}{10R_0^2} < \beta < 2\frac{\alpha}{R_0}.$$

The following example illustrates the properties of a beam generated in accordance with equation (24) optimized for variety of bar-code densities ranging from 7.1 mil to 100 mil and having spot ellipticity up to 110 inches from exit pupil. The beam is predicted to provide the following working ranges (measured from exit pupil):

| Bar-code module, mil | Working range, inches |
|---|---|
| 7.5 | From 8.5 to 25 |
| 10 | From 8.5 to 42 |
| 15 | to 81 |
| 20 | to 112 |
| 40 | to 240 |
| 55 | to 330 |
| 70 | to 420 |
| 100 | to 600 |

Beam parameters (x is scanning direction, y is perpendicular one):
(a) Laser

| | |
|---|---|
| wavelength: | 635 nm |
| divergence angles: | 8° × 28° (x x y) |

(b) Lens

| | |
|---|---|
| focal length: | 9.2 mm |
| aperture: | 3 × 2.5 mm (x x y) |

(c) Wave front deformation parameters:

| | |
|---|---|
| cone angle coefficient | $\alpha = 1.4 \cdot 10^{-3}$ |
| defocus coefficient | $\beta = 0.6 \cdot 10^{-3}$ mm$^{-1}$ |
| amplitude y-axis | $W_0 = 380$ nm |

Figure 9A:
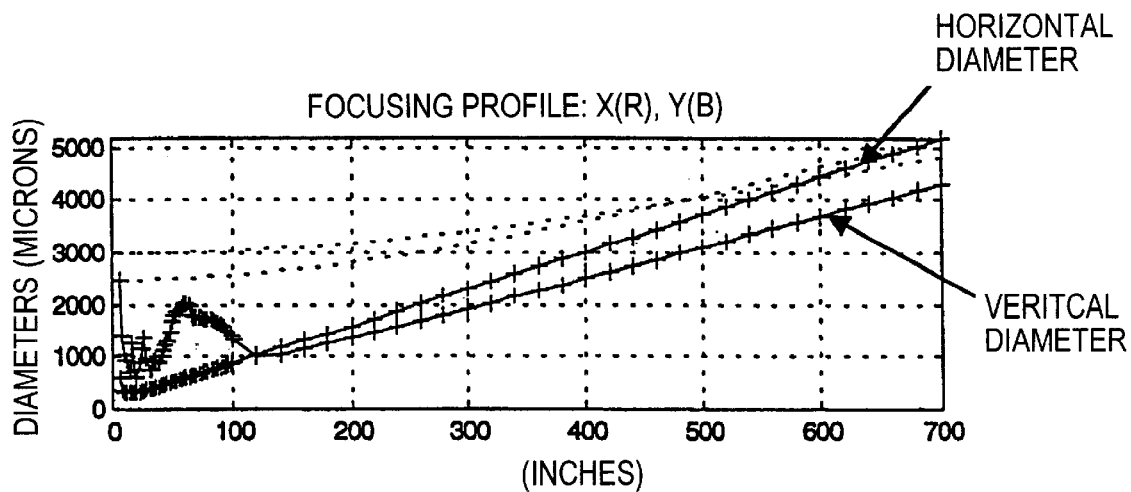
FIGS. 9(a) and (b) illustrate the beam diameter and modulation transfer function (MTF) of a laser scanning beam in accordance with a preferred embodiment of the present invention.
Figure 9B:
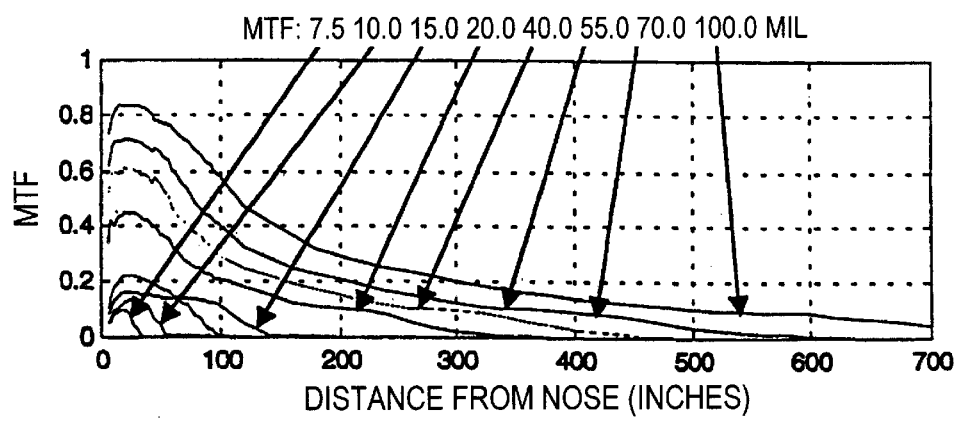

FIG. 9(a) shows the Focusing Profile of the laser beam and FIG. 9(b) shows MTF of the system. The focusing profile illustrates how beam diameter (in microns) diverges as distance (in inches) from the scanner increases. Beam diameters in the horizontal scanning) and vertical planes are calculated at 50% intensity level. FIG. 9(b) illustrates how the MTF of the system varies with code density and distance.

Figure 10B:
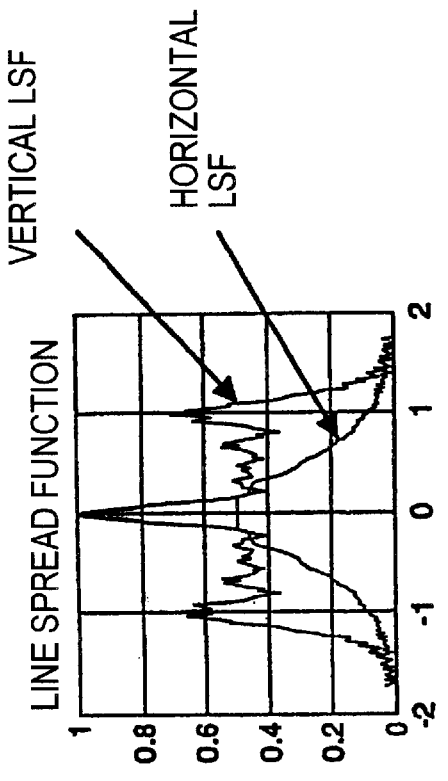
Figure 10A:
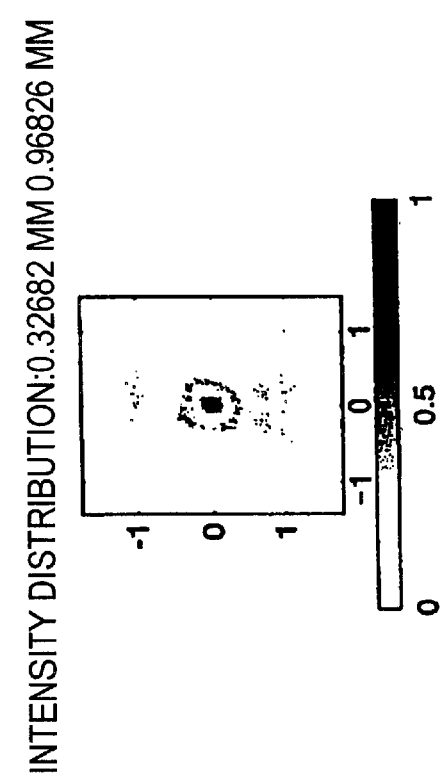
Figure 10C:
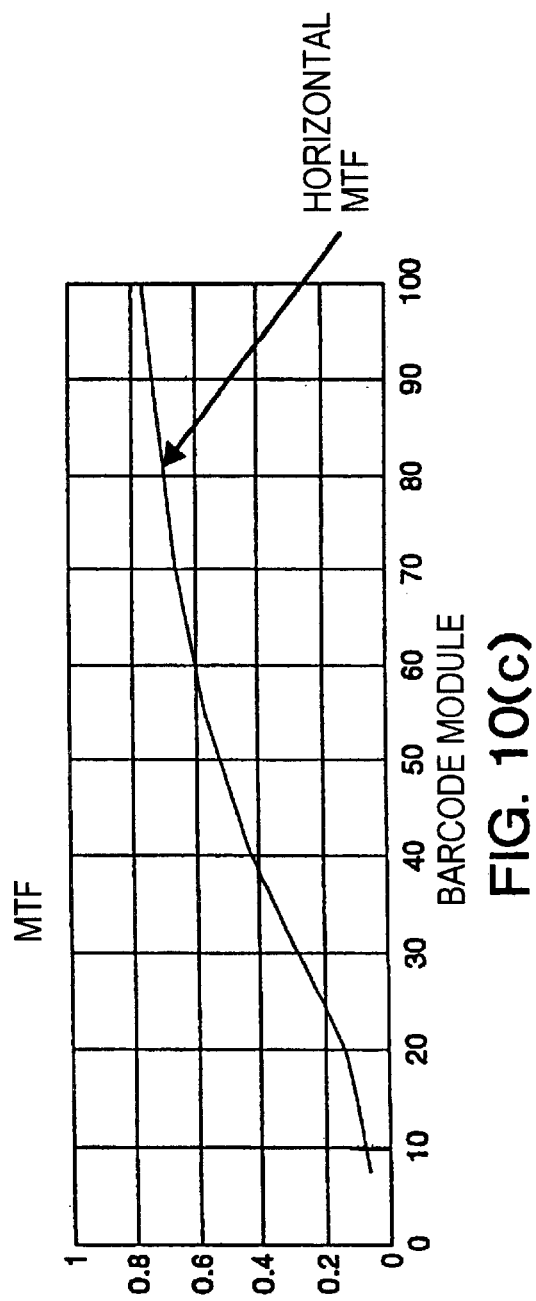

FIGS. 10–14 show laser spot characteristics at various working distances: 8.5, 25, 81, 112 and 600 inches, respectively. In particular, FIG. 10 illustrates laser spot characteristics at a minimum working distance of 8.5 inches. The size and elongation of the spot is illustrated by the intensity distribution of FIG. 10(a). The intensity profile of the spot is shown along the x and y axis in the graph of the Line Spread Functions (LSF) in FIG. 10(b). It will be observed that the effective spot dimension in the y-direction is greater than in the x direction i.e. the spot is elongated. The horizontal MTF at 8.5 inches is presented as a function of bar code module size in mils in FIG. 10(c).

Similar data is presented for the same beam at greater working distances in FIGS. 11–14 which represent maximum working distances for 7.5 mil, 15 mil, 20 mil and 100 mil bar code modules, respectively. It will be observed that the y axis elongation or stretching of the spot is substantially greater at short working distances and gradually diminishes as working distance increases.

III. Plastic Aberration Corrector For Glass Lenses

The most economical way for mass producing aspherical lenses is plastic molding. However, the strong temperature dependence of the refractive index of plastic causes undesirable lens focal plane shifting with temperature. Therefore, plastic lenses are typically not used in applications where stable focal distance is required over a wide temperature range.

There are several known mass production methods to make temperature-stable aspherical lenses for laser beam transformations (collimating, focusing, etc.):

(a) spherical glass lens with attached plastic aspherical replica;

(b) aspherical glass molded lens;

(c) plastic athermalized aspherical lens using combination of diffractive and refractive optical power.

The first two methods use specialized optical technology that may lead to an increased part price. The third type of lens system suffers from energy losses at the diffractive surface.

It is an object of the present invention is to provide a high-quality, cost-effective, mass producible and temperature-stable aspherical lens system. The technique is advantageously used in both conventional laser bar code scanners and in scanners using the elongated, diverging laser beams disclosed herein.

In accordance with the present invention, a spherical glass lens is used with a separate plastic phase plate for aberration correction. In the simplest embodiment, all optical power is provided by a stable glass component. The phase plate has little or no optical power and provides correction of the spherical aberrations of the lens. Optical path difference (OPD) introduced by a refractive component into the transmitted wave front is determined by the component refractive index n and thickness t as function of radius r:

$$W(r) = (t(r) - t(0)) \cdot (1 - n) \tag{25}$$

Change of OPD due to temperature dependence of refraction index is given by the expression $$\Delta W = \Delta T * \frac{\partial W}{\partial n} \frac{\partial n}{\partial T} = \Delta T * \frac{\partial n}{\partial T} \cdot \frac{W}{n-1} \tag{26}$$

The smaller the nominal OPD (W) introduced by the refractive component is, the less the wave front distortion ΔW caused by temperature dependence of refractive index $\partial n/_{\partial T}$ is. This is why a plastic component having high coefficient $\partial n/_{\partial T}$ can be a stable aberration corrector although not stable as a lens.

Figure 15:
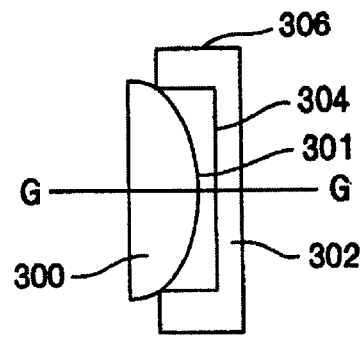
FIG. 15 is a cross-sectional view of a glass lens and plastic aberration corrector in accordance with a preferred embodiment of the present invention.

FIG. 15 shows a glass lens 300 with a spherical surface 301 used in combination with a separate plastic phase plate 302 for aberration correction. The surface 304 of the plate 302 may include a spherical aberration correction component given by the expression:

$$a \cdot r^4 + b \cdot r^6 + \ldots$$

where a is a constant and r is the radial distance from the optical axis (27) G—G.

IV. Athermalized Laser Assembly Using Plastic Element

The focusing stability of a conventional laser assembly of a bar-code scanner is affected mainly by thermal expansion of the housing. This is especially true when using, in high volume production, cast metal components (for example, cast zinc) having a large thermal expansion coefficient. Thermal focusing shift then becomes a limiting factor of high-end bar-code scanner performance.

The purpose of the invention is to provide a cost effective, thermally stable focusing solution for high-volume, high-performance, bar-code scanners and particularly for bar-code scanners using the elongated, diverging beam of a preferred embodiment of the present invention.

Figure 16:
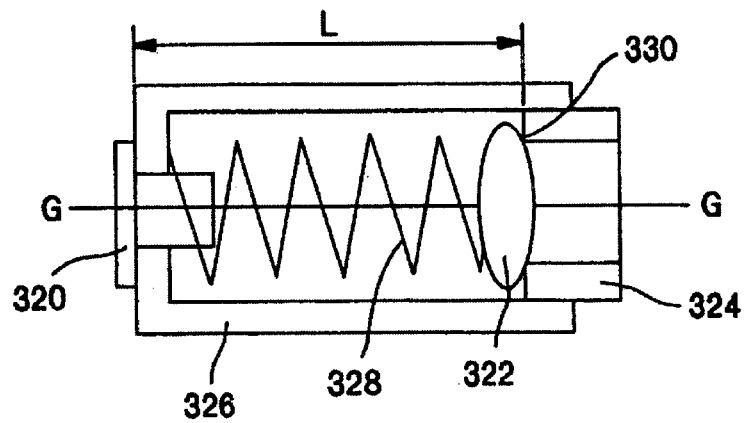
FIG. 16 is a cross-sectional view of a prior art lens and laser diode structure.

FIG. 16 shows a conventional laser assembly for a bar-code scanner. The assembly includes laser diode 320, glass lens 322, metal lens holder 324, metal laser holder tube 326, and spring 328. The lens may be attached to the lens holder 324 by glue applied to an annular rim 330. By adjusting the position of the lens holder 324 relative to the holder tube 326 and attached laser 320, the lens is set at the designed distance from the laser. The distance between the laser and the lens focal plane changes with temperature due to thermal expansions of the glass and metal and also due to change of the refractive index of the glass. When using cast metal holders 324 and 326, their thermal expansion/shrinkage plays the major role in focusing change. The thermal change of the distance between laser and the lens flange can be determined as:

$$\Delta x = \Delta T \cdot Cm \cdot L \quad (28)$$

where Cm is the thermal expansion coefficient of the metal holders, and L is the distance between laser and lens flanges.

Figure 17:
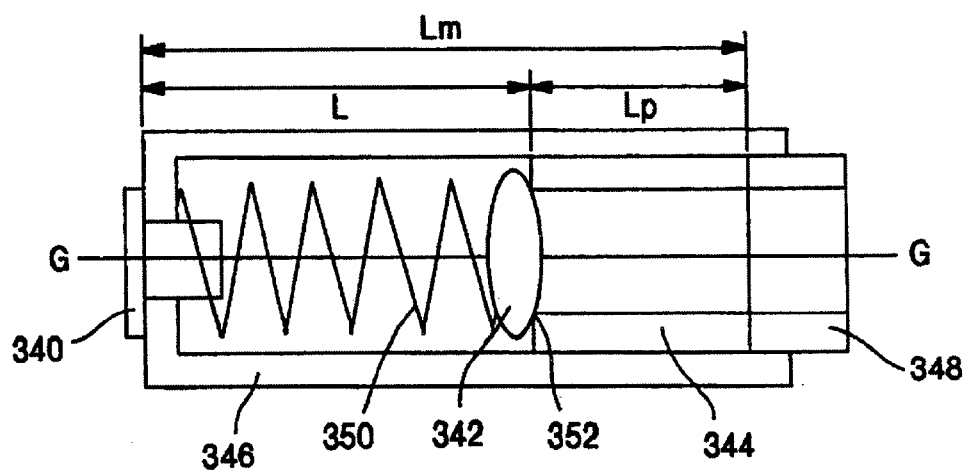
FIG. 17 is a cross-sectional view of an athermalized laser assembly using a plastic element.

FIG. 17 shows a thermally-compensated laser assembly of a preferred embodiment of the present invention. It consists of laser diode 340, glass lens 342, plastic lens holder 344, laser holder tube 346, metal locking ring 348, and spring 350. The lens 342 may be glued to the annular rim 352 of the plastic lens holder 344. When temperature increases, the laser holder 346 will expand, moving lens 342 away from laser 340. A holder 344 is preferably made from a material having a thermal expansion coefficient relatively higher than the laser holder tube 346. For example, the holder 344 may be made from a higher thermal expansion coefficient plastic, while the tube 346 is made of a relatively lower thermal expansion coefficient metal. The lens holder 344, having a length Lp selected as described below, tends to move the lens back into its original position relative to the laser, and thereby cancel out the effects of thermal expansion.

The length of the plastic holder Lp can be chosen based on the thermal expansion coefficients of laser holder tube 346, lens holder 344, and glass lens 342. Change of the glass refraction index also can be taken into consideration.

To illustrate a choice of the plastic holder length Lp, let us assume that the lens does not expand, and its refraction index does not change with temperature. In this case, the amount of defocus can be calculated as $$\Delta x = \Delta T \cdot (Cm \cdot Lm - Cp \cdot Lp) \quad (29)$$

$$Lm = L + Lp \quad (30)$$

where Cm and Cp are the thermal expansion coefficients of metal and plastic respectively, L is the separation between the laser diode and the lens, and Lm and Lp are the flange length of metal laser holder tube and plastic lens holder, respectively. From equations (29) and (30), one can obtain the length Lp that provides the thermal stability for focusing:

$$\Delta x = 0 \text{ if } Lp = L \cdot \frac{Cm}{Cp - Cm} \quad (31)$$

For example, if L=10 mm, Cm=27·10$^{-6}$ (cast zinc), and Cp=65·10$^{-6}$ (acrylic), then according to equation (31) Lp should be selected to be 7.1 mm.

In a particular optomechanical design, the plastic lens holder can be replaced by a separate plastic part. Also, length Lp can be chosen for full thermal compensation including thermal changes of the glass lens material.

V. Athermalized Optical System For Producing Laser Beams, Including Elongated, Nearly Diffraction Free Laser Beams Various of the techniques previously described can be combined to provide an athermalized optical system for producing laser beams, including elongated diverging laser beams of the preferred embodiments described in Sections I and II above. A molded plastic element or component may be used to implement some of the techniques.

Figure 18:
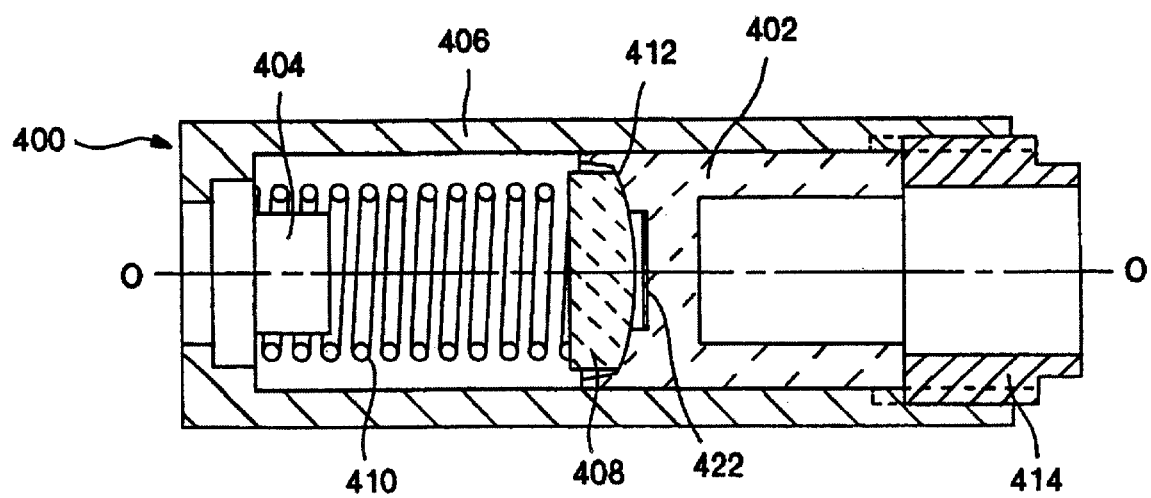
FIG. 18 is a cross-sectional view of an athermalized optical system for producing diverging, nearly diffraction free beams including stretched beams in accordance with preferred embodiments of the present invention.

FIG. 18 illustrates an optical system 400 of a preferred embodiment of the present invention. The plastic element 402 is shown in the system and in the detail FIG. 18(a). The system includes a laser diode 404 mounted in a metal tube 406 on the optical axis 0—0. A glass lens 408 is held in position by a compression spring 410 and the plastic element 402. Advantageously, glue may be applied at shoulder regions 412 of the plastic element to maintain the glass lens in position. A metal nut 414 may be employed to secure the plastic element 402 in place.

Figure 18A:
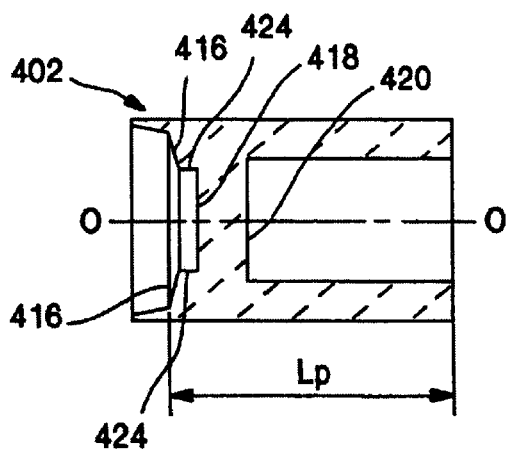
FIG. 18(a) is a detail of a plastic element used in the optical system of FIG. 18.

As shown in detail of FIG. 18(a) the molded plastic element 402 is formed with shoulder surfaces 416 to retain the glass lens. Surfaces 418 and 420 are optical surfaces whose design and function is described below. The aperture 422 of the optical system is defined by the surface 418 and bounded by annular edges 424 of the plastic element.

In a more preferred embodiment, a linear axicon is formed in surface 418. The glass lens is a piano spherical lens to provide the necessary optical power. In the most preferred embodiment, the glass lens and separation distance between the laser diode and the lens are selected to provide the β term portion of the wave front deformation set forth in equation (1). Thereby, a diverging, nearly diffraction free laser beam is formed. Surfaces 418 and 420 may be used to introduce an optical path difference (OPD) between axial ray and a ray with coordinates (x,y) determined by the formula:

$$OPD = C_1 \cdot (x^2+y^2)^2 + C_2 \cdot \sqrt{x^2+C_3 \cdot y^2} + C_4 \cdot \cos(C_5 \cdot y) + C_6 \cdot x^2 + C_7 \cdot y^2 \quad (32)$$

where x is the axis in the scanning direction, and y is perpendicular to x. The coefficient $C_1$ can be chosen to provide compensation for the glass lens spherical aberration as described in Section III above. An element exhibiting such behavior can be generated as a diffractive optical element (DOE). DOE's are conventional optical element and uses of them are described in the '143 patent mentioned above.

Coefficient $C_2$ can be chosen to generate a laser beam with optimized working ranges and module size ranges as discussed in Section I, above. More specifically, the coefficient $C_2$ may be chosen to equal α where α is the cone angle of the wave front as presented in equation 1.

Coefficients $C_3$, $C_4$ and $C_5$ can be chosen to provide desired laser beam stretching perpendicular to the scan lines. The coefficients $C_4$ and $C_5$ corresponds to the terms $W_0$ and $$\frac{2\pi}{A}$$

in equation (15) and provide the cosine grating described in Section II above. In a preferred embodiment $C_3$ is set equal to one. However, $C_3$ may be adjusted to add some ellipticity to the spot.

Coefficients $C_6$ and $C_7$ can be chosen to provide correction of laser astigmatism, additional beam stretching, and to minimize residual optical power of the plastic component.

Length $L_p$ of the plastic part can be chosen to provide thermo-stable focusing as described in Section IV above.

VI. Performance Variations with Changes in Aperture

Figure 19:
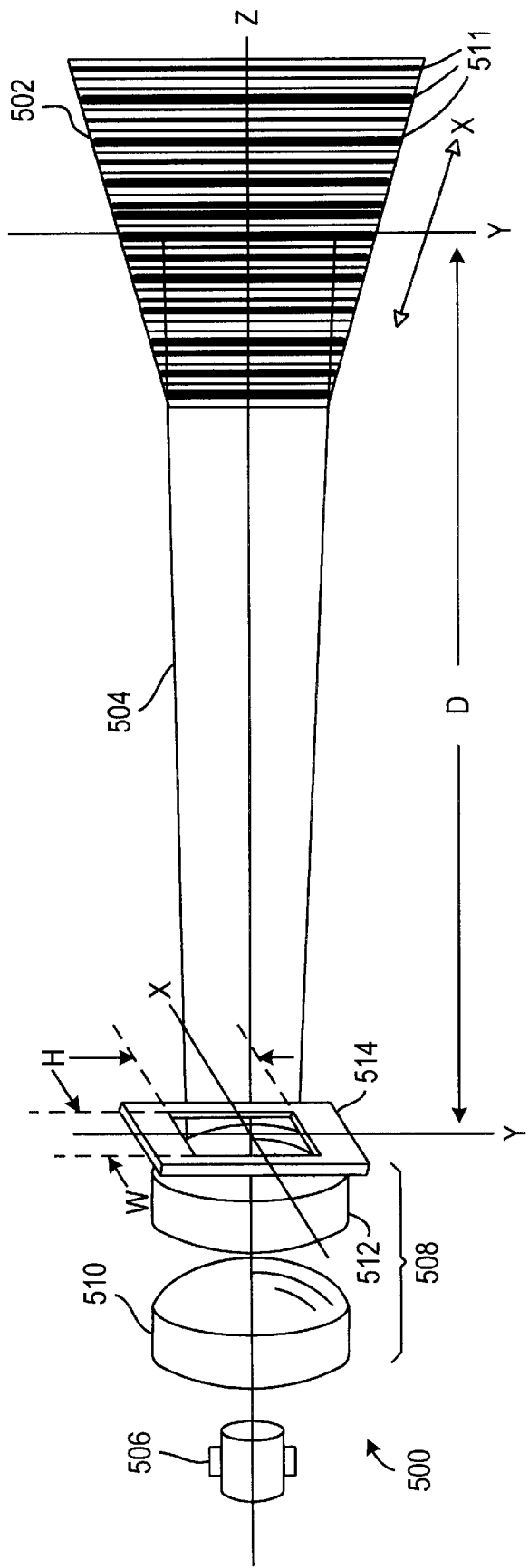
FIG. 19 is a pictorial view of an apparatus for producing a laser beam for scanning optical code in accordance with a preferred embodiment of the present invention.

FIG. 19 is a pictorial view of an apparatus for producing a laser beam for scanning optical code in accordance with a preferred embodiment of the present invention. The apparatus is a basis for examples of beams and system performance obtained by using various apertures. FIG. 19 and the description herein is based on the geometry of three, mutually perpendicular (orthogonal) directions, x, y & z. The directions, x, y and z, are used to describe the structure of the laser beam source 500, the orientation of a bar code symbol 502 located an arbitrary distance, D, from the beam source and characteristics of the laser beam 504.

In preferred embodiments, the laser beam 504 is projected in the direction z. In operation, the laser beam may be scanned back and forth across the symbol 502 in the direction x. This may be accomplished in a conventional manner, for example, by reflecting the laser beam off a moving mirror (not shown). However, for ease in understanding, FIG. 19 is drawn so that the projection axis of the laser 506, the optical axis of optical system 508 and the projection axis of the beam 504 are all co-linear and oriented in the z direction, to demonstrate the relative orientation of the code symbol, laser beam and laser beam aperture. In real systems the optical axis of the system may be folded and/or deflected. It will be understood that the directions x and y will be reoriented in a corresponding manner so that they remain mutually perpendicular to the axis z.

The beam 504 may scan across the symbol 502 in a direction x generally perpendicular to an axis of elongation (i.e. the y direction) of features of the optical code such as the bars 511 which make up the symbol 502. Advantageously, the laser 506 is a laser diode whose output beam forms an elliptical spot. The laser diode, and optics are arranged so that the axis of elongation of the elliptical spot is perpendicular to the scanning direction x, i.e., parallel to the bars 511.

The optical system 508 may be one of the structures shown and described in connection with FIG. 6 and includes an aperture. The aperture may be defined in a conventional manner, for example by an aperture plate, by peripheral edges of one or more lens elements in the optical system such as the edge of the axicon, etc. The aperture preferably has a horizontal (x direction) dimension, w, and a vertical (y direction) dimension, h, which dimensions are selected in accordance with performance criteria such as anticipated symbol module size, anticipated scanning range, desired depth of field, etc., as exemplified below. For example, the aperture may be rectangular-shaped, elliptical-shaped or cats-eye-shaped.

In the particular embodiment of FIG. 19, the optical system 508 includes a spherical collimation lens 510, a linear axicon lens 512 and an aperture plate 514. The lens 510 and distance from the effective source of the beam from the laser diode 506 are selected to partially collumate and focus the laser beam to produce a wave front with a deformation of $-\beta r^2$ from a reference plane parallel to the plane back surface of lens 510, as described in Section I above. Advantageously, the upper limit of $\beta$ is inversely proportional to the aperture dimension, w, and in accordance with the formula: $\beta < \alpha/0.5$ w. The beam 504 has a non-zero divergence as indicated by the gradually expanding beam size represented by the sloping lines which diverge moving from left to right in FIG. 19.

The aperture plate 514 has a rectangular opening with a width dimension, w, (x direction) and a height dimension, h, (y direction). A change in the h dimension changes the beam spot in the x direction as described below. The aperture plate 514 is located approximately in the plane of the conical portion of the axicon lens 512 (the conical portion of the lens 512 typically has a dimension from vertex to base of on the order of 0.7 microns).

Figure 20:
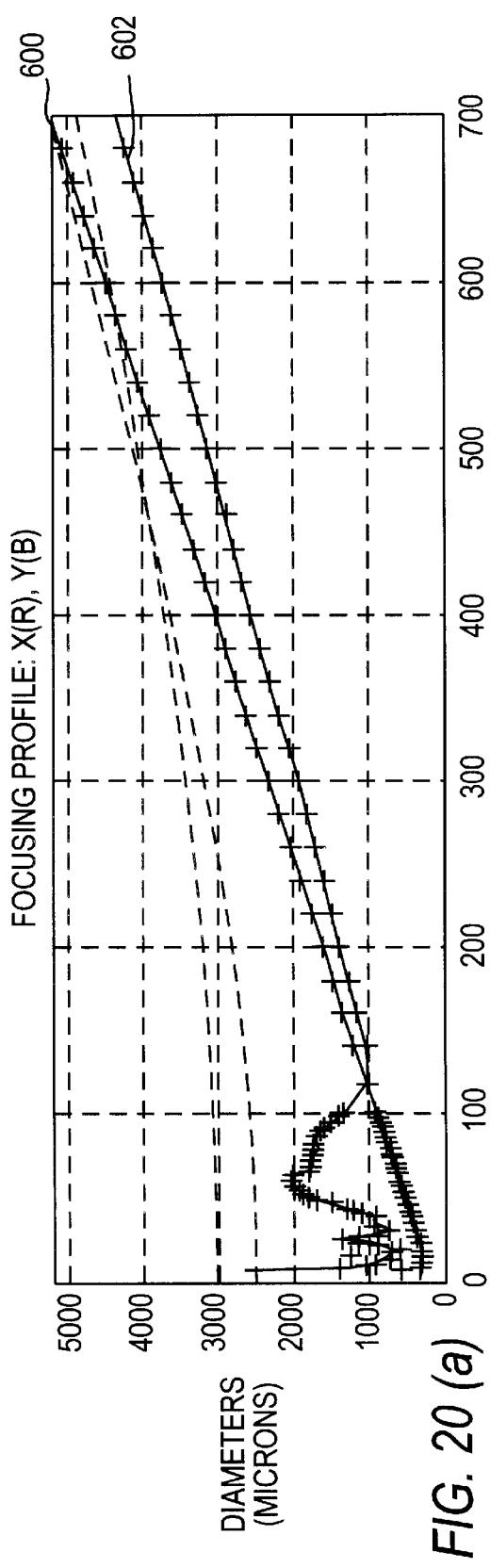
FIGS. 20, 21 and 22 illustrate characteristics of a laser beam produced by the apparatus of FIG. 19 including beam dimensions (a) and MTF for various code sizes (b).
Figure 20:
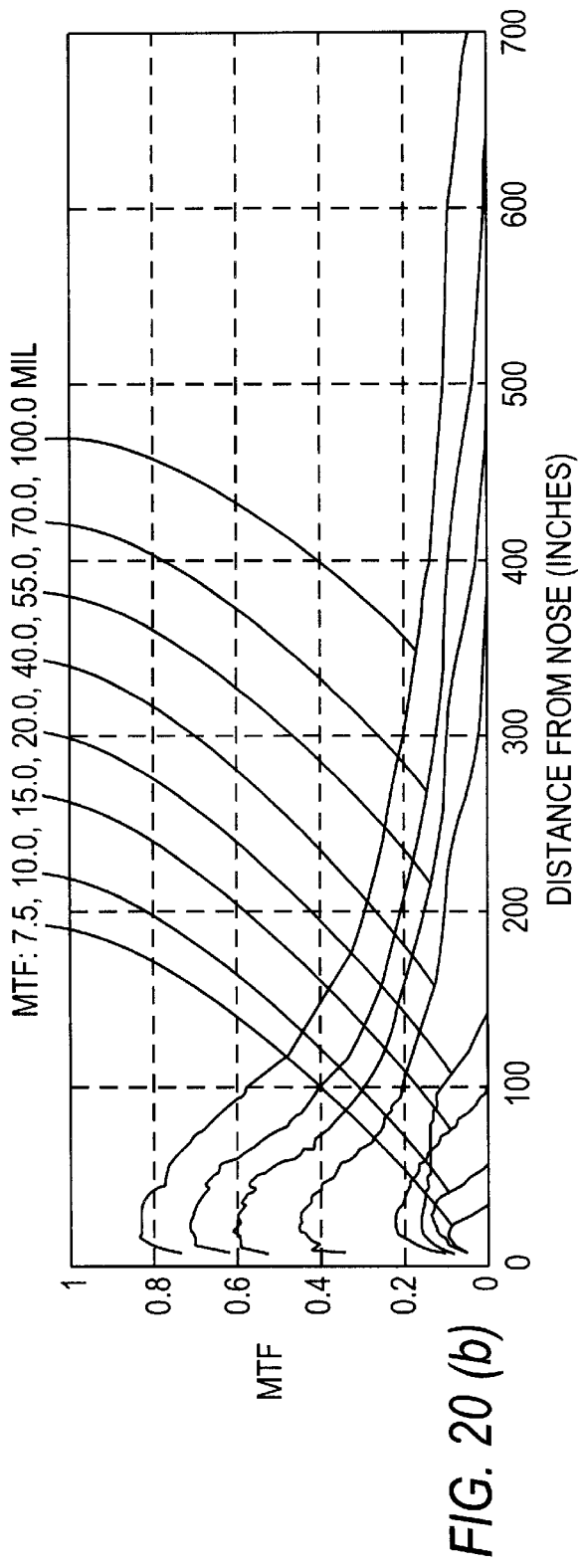
Figure 21:
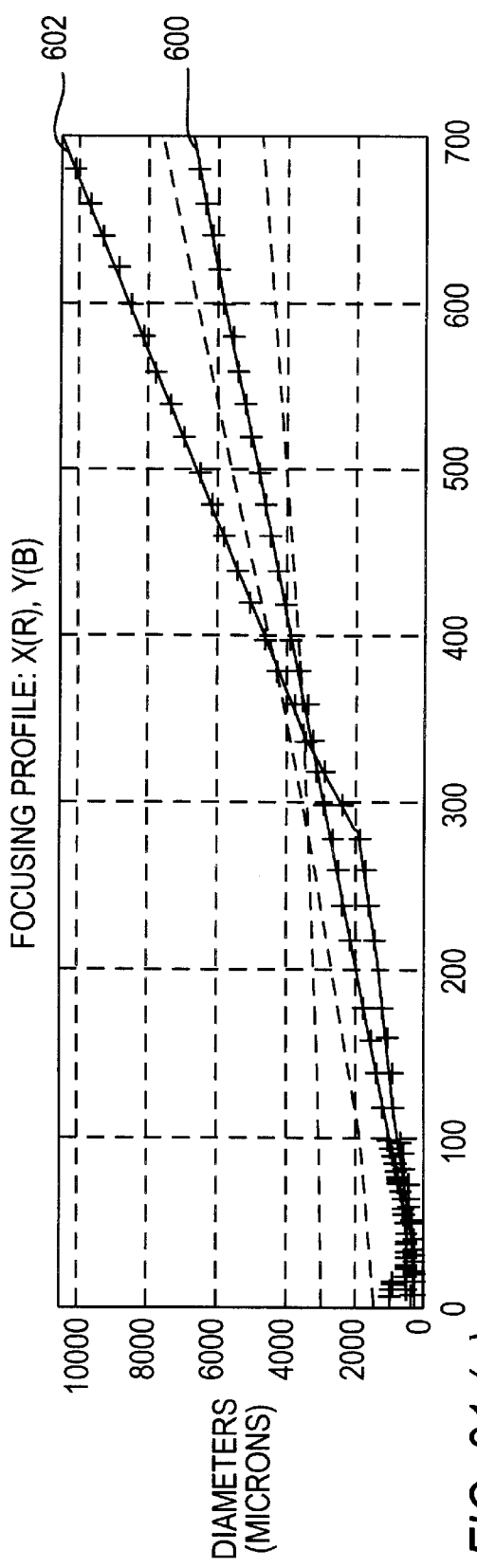
Figure 21:
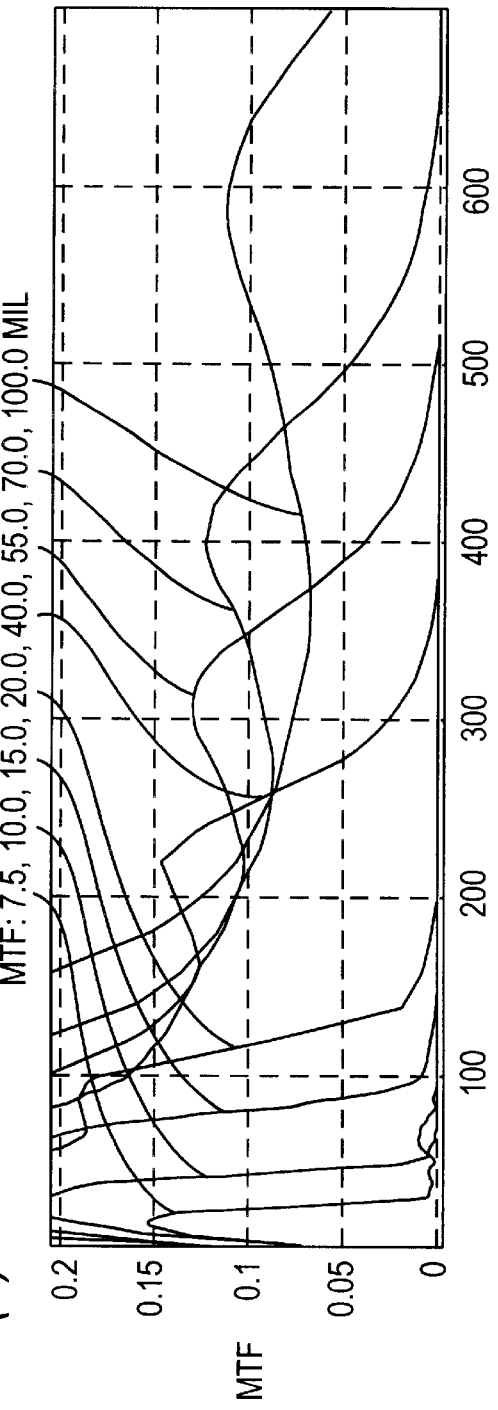
Figure 22:
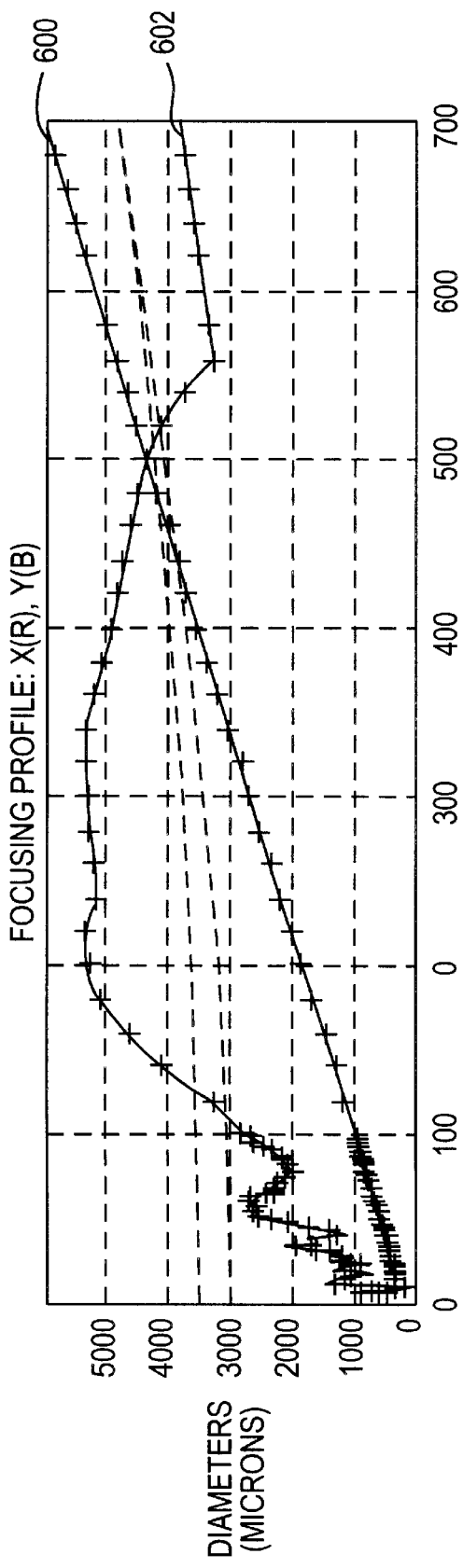
Figure 22:
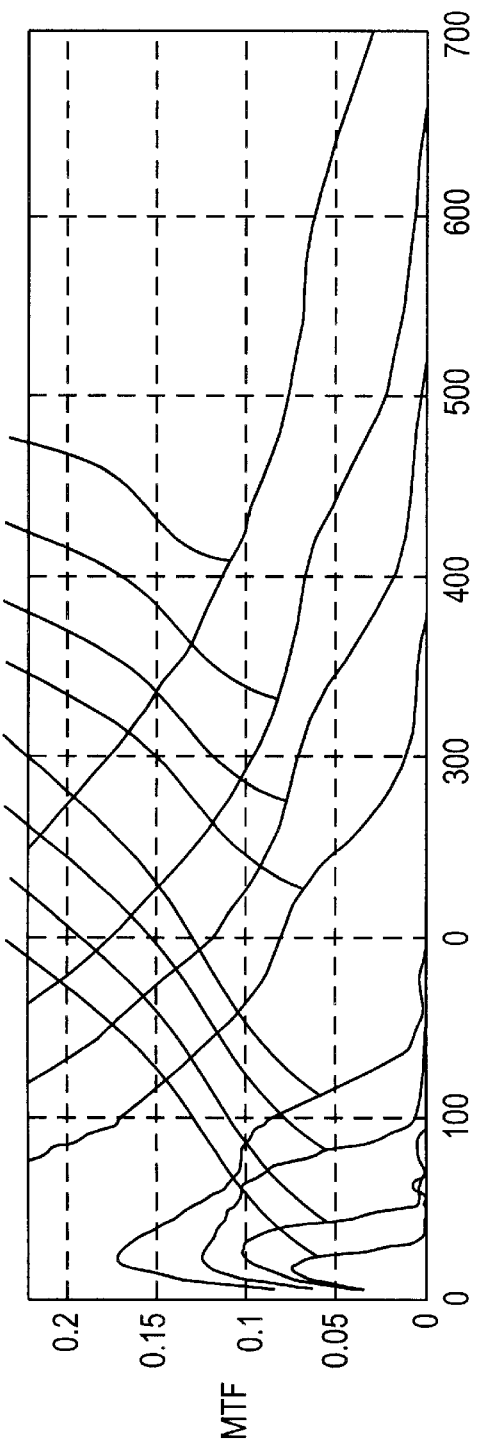

FIGS. 20, 21 and 22 illustrate characteristics of a laser beam produced by the apparatus of FIG. 19 assuming three different aperture heights h. More specifically, FIGS. 20, 21 and 22 show beam dimensions (a) and MTF for various code sizes (b), for each of these aperture heights, h of a rectangular aperture. For purposes of these figures aperture width, w, is held constant at 3 mm.

In the embodiment of FIG. 20 the height dimension of the laser spot at the axicon lens 512 has been used to control the working ranges of the bar-code scanner based on signal processing capabilities. FIG. 20 employs an aperture height dimension of 2.5 mm. This dimension was optimized for an MTF of 0.1 which is assumed to be sufficient for processing by a digitizer associated with the system. For different MTF levels, an optimum vertical aperture may be different.

FIG. 20(a) illustrates the calculated x direction dimension 600 and y direction dimension 602 of the beam as it propagates from the system. The dimensions represent a 50% intensity level of the central peak of the beam. The x direction dimension 600 gradually increases with distance from the system (i.e. the beam diverges) without breaking into a donut intensity distribution, even at a distance of 700 inches from the scanner.

FIG. 20(b) illustrates the MTF for eight different code symbol module sizes from 7.5 mil to 100.0 mil bar code. As shown in the Figure there is a useful working range (MTF≧0.1) for all eight module sizes.

The effect of changing the dimension h of the aperture, while holding other system parameters constant, is illustrated in FIGS. 21 and 22. In FIG. 21, h is reduced to 1.5 mm. In FIG. 22, h is increased to 3.5 mm. The effect on the spot size of the system is illustrated in FIGS. 21(a) and 22(b). It will be observed that the change in the dimension h effects the spot size in both the x and y directions.

The effect of changing the h dimension of the aperture on the various working ranges of the system is illustrated by comparing FIGS. 20(b), 21(b) and 22(b). The increase and decrease of the aperture dimension h decreases working ranges, indicating that the system design of FIG. 20 is preferred. Thus, the aperture dimensions may be selected on the basis of anticipated target symbol module size, anticipated scanning range and desired depth of field for each. Thus, there is provided an additional design variable, h, to provide the ability to better match the signal processing capabilities and performance requirements of the system.

The use of a laser diode with an elliptical beam spot provides greater freedom to adjust the dimension h of the aperture. It will be understood that beam truncation in the vertical direction is readily tolerated to permit optimization of the beam width for the anticipated symbol module sizes, scanning range, depths of field and digitizer capabilities.

While aspects of the present invention have been described with reference to preferred embodiments and examples, the invention to be protected is defined by the literal language of the following claims and equivalents thereof.

We claim:

1. A laser beam projected from an optical code reader along a propagation axis z, for scanning an optical code in a direction x, generally perpendicular to an axis of elongation of features in the optical code, the features extending along a direction y generally perpendicular to the x direction, wherein dimensions of a central peak of the beam in planes perpendicular to the propagation axis increase in both the x and y directions with distance from the code reader, wherein the laser beam is truncated by an aperture in the optical code reader, wherein a change in a y dimension of the aperture changes an x dimension of the central peak of the beam, and wherein the laser beam has a wave front having a deviation W(r) relative to a reference plane generally perpendicular to the propagation axis, the deviation being characterized by:

$$W(r) = \alpha r - \beta r^2$$

wherein r is a radial distance from the propagation axis,
wherein $\alpha$ is selected to produce a spot of the beam at a minimum scanning distance with a diameter $d_0$ sufficient to permit reading of the code at its highest density, and
wherein $\beta$ is selected to provide optimum working ranges for codes of different densities.

2. The laser beam of claim 1, wherein $\alpha$ is between $0.2 \cdot 10^{-3}$ and $6 \cdot 10^{-3}$ mm$^{-1}$.

3. The laser beam of claim 1, wherein $\beta < \alpha/0.5$ w where w is a width of the aperture in the x direction.

4. A method of shaping a laser beam for scanning an optical code in a scanning direction x, comprising the steps of:
   a) projecting the laser beam along a propagation axis to the code;
   b) selecting an optical system for modifying the laser beam to have a generally conical wave front and an intensity profile in the x direction characterized by a central peak with a diameter which increases as a function of distance from the system the wave front having a deviation W(r) relative to a reference plane generally perpendicular to the propagation axis, the deviation being characterized by:

$$W(r) = \alpha r - \beta r^2$$

wherein r is a radial distance from the propagation axis,
   wherein $\alpha$ is selected to produce a spot of the beam at a minimum scanning distance with a diameter $d_0$ sufficient to permit reading of the code at its highest density, and
   wherein $\beta$ is selected to provide optimum working ranges for codes of different densities;
   c) selecting an aperture for limiting the beam and for producing a desired dimension in the x direction of the central peak.

5. The method of claim 4, wherein an aperture dimension perpendicular to the x direction is selected to vary the dimension of the central peak in the x direction.

6. The method of claim 4, wherein, in addition to the central peak, a plurality of secondary peaks is produced, the secondary peaks being located on either side of the central peak.

7. The method of claim 4, wherein the central peak has a dimension which increases as a function of distance from the system by a factor of between $0.2 \cdot 10^{-3}$ and $6 \cdot 10^{-3}$ per mm of distance projected.

8. The method of claim 4, wherein the selections are made on the basis of anticipated module size of features in the code, anticipated scanning range and desired depth of field.

9. The method of claim 4, wherein the laser beam produces an elliptical spot elongated in a direction perpendicular to the x direction.

10. An apparatus for scanning an optical code, comprising: a source of a scanning laser beam for directing the laser beam along a propagation axis toward the optical code to be scanned and causing the beam to move in a scan direction x; and a light detector for receiving light reflected from the optical code, wherein the source of the laser beam includes a laser and an optical system positioned with respect to the laser, the optical system being configured to produce a generally conically-shaped wave front in the laser beam and a central spot which increases in useable area with distance from the scanning apparatus, wherein the source of the laser beam has an aperture having two orthogonal dimensions, w and h, w being a dimension in the x direction, wherein a change in the dimension of the aperture changes a dimension of the spot in the x direction, and wherein the wave front has a deviation W(r) relative to a reference plane generally perpendicular to the propagation axis, the deviation being characterized by:

$$W(r) = \alpha r - \beta r^2$$

wherein r is a radial distance from the propagation axis,
wherein $\alpha$ is selected to produce a spot of the beam at a minimum scanning distance with a diameter $d_0$ sufficient to permit reading of the code at its highest density, and
wherein $\beta$ is selected to provide optimum working ranges for codes of different densities.

11. The apparatus of claim 10, wherein the laser is a laser diode which produces an elliptical beam spot elongated in a y direction perpendicular to the x direction.

12. The apparatus of claim 11, wherein the aperture is defined by a rectangularly-shaped opening with the dimension w and the dimension h being in the x and y directions, respectively.

13. The apparatus of claim 11, wherein the aperture is defined by an elliptically-shaped opening.

14. The apparatus of claim 11, wherein the aperture is defined by a cat's-eye-shaped opening.

15. The apparatus of claim 10, wherein the optical system includes at least one optical element for partially collimating the laser beam, and for imposing a generally conical wave front deformation on the laser beam directed toward the optical code.

16. The apparatus of claim 10, wherein the optical system includes a plano-convex lens for partially collimating the laser beam and an optical element having a substantially flat first surface perpendicular to the propagation axis, and a second surface defined by a figure of rotation formed by rotating a line about the propagation axis at an acute angle with respect thereto, thereby defining the optical element which causes a phase tilt in the beam inward toward the propagation axis.

17. The apparatus of claim 16, wherein the aperture is defined by an aperture plate located approximately in a plane of the figure of rotation defining the second surface of the optical element.

18. The apparatus of claim 10, wherein the optical system includes a collimating lens, a lens providing magnification to cause divergence of the resulting scanning laser beam, and a linear axicon lens to produce the conical wave front deformation in the laser beam.

19. The apparatus of claim 18, wherein the aperture is defined by a rectangular aperture opening associated with the axicon lens.

20. The apparatus of claim 10, wherein the scanning laser beam has a transverse field distribution that is expressed as a series containing Bessel functions, and wherein essentially only a central peak is employed for scanning.

21. A method of producing a laser beam for a bar code scanner which scans the bar code in a direction x, comprising the steps of:
   a) emitting a laser beam from a laser diode along a propagation axis and having an elliptical spot elongated in a direction y perpendicular to the x direction;
   b) imposing a generally conical wave front deformation on the laser beam, and wherein the wave front has a deviation W(r) relative to a reference plane generally perpendicular to the propagation axis, the deviation being characterized by:

$$W(r) = \alpha r - \beta r^2$$

wherein r is a radial distance from the propagation axis,
   wherein $\alpha$ is selected to produce a spot of the beam at a minimum scanning distance with a diameter $d_0$ sufficient to permit reading of the code at its highest density, and
   wherein $\beta$ is selected to provide optimum working ranges for codes of different densities;
   c) selecting a dimension for an aperture in the y direction perpendicular to the x direction to obtain the spot having a dimension in the x direction which is optimized for signal processing of the bar code scanner; and
   d) limiting the laser beam with the selected aperture.

22. The method of claim 21, wherein the laser beam produced is a diverging, nearly diffraction-free laser beam.

* * * * *